United States Patent
Zhou et al.

(10) Patent No.: US 12,034,170 B1
(45) Date of Patent: Jul. 9, 2024

(54) END COVER ASSEMBLY, ENERGY STORAGE APPARATUS, AND ELECTRIC DEVICE

(71) Applicants: SHENZHEN HITHIUM ENERGY STORAGE TECHNOLOGY CO., LTD, Guangdong (CN); XIAMEN HITHIUM ENERGY STORAGE TECHNOLOGY CO., LTD., Fujian (CN)

(72) Inventors: Wenyang Zhou, Guangdong (CN); Yongfeng Xiong, Guangdong (CN); Jinqiang Chen, Guangdong (CN)

(73) Assignees: SHENZHEN HITHIUM ENERGY STORAGE TECHNOLOGY CO., LTD, Guangdong (CN); XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/533,140

(22) Filed: Dec. 7, 2023

(51) Int. Cl.
  *H01M 50/15* (2021.01)
  *H01M 50/103* (2021.01)
  (Continued)

(52) U.S. Cl.
  CPC ......... *H01M 50/15* (2021.01); *H01M 50/103* (2021.01); *H01M 50/342* (2021.01);
  (Continued)

(58) Field of Classification Search
  CPC .. H01M 50/30; H01M 50/308; H01M 50/317; H01M 50/325; H01M 50/342;
  (Continued)

(56) References Cited

U.S. PATENT DOCUMENTS 10,811,650 B2 * 10/2020 Wakimoto ............ H01M 50/30
2010/0143796 A1 6/2010 Mao et al.
(Continued)

FOREIGN PATENT DOCUMENTS

CN 206349416 U 7/2017
CN 206541867 U 10/2017
(Continued)

OTHER PUBLICATIONS

International Search Report and Written Opinion dated Jul. 24, 2023 in International Application No. PCT/CN2023/075250. English translation attached.
(Continued)

*Primary Examiner* — Amanda J Barrow

(57) ABSTRACT

The present disclosure provides an end cover assembly, an energy storage apparatus, and an electric device. The end cover assembly includes a top cover, an explosion-proof sheet, and a shielding member. The top cover has a first surface and a second surface facing away from the first surface. The top cover further has an explosion-proof hole through the first surface and the second surface. The explosion-proof sheet is configured to seal the explosion-proof hole and is connected to the top cover. The shielding member is located at a side of the explosion-proof sheet close to the second surface and is connected to the top cover. The top cover, the explosion-proof sheet, and the shielding member form a chamber. The shielding member has a first air vent in communication with the chamber.

18 Claims, 9 Drawing Sheets

(51) Int. Cl.
  *H01M 50/30* (2021.01)
  *H01M 50/342* (2021.01)
  *H01M 50/383* (2021.01)
(52) U.S. Cl.
  CPC ....... *H01M 50/383* (2021.01); *H01M 50/394* (2021.01); *H01M 2220/20* (2013.01)
(58) Field of Classification Search
  CPC ........... H01M 50/3425; H01M 50/375; H01M 50/35; H01M 50/367; H01M 50/392; H01M 50/655
  See application file for complete search history.

(56) References Cited

U.S. PATENT DOCUMENTS

| | | | |
|---|---|---|---|
| 2016/0133901 A1* | 5/2016 | Li | ..................... H01M 10/0525 429/56 |
| 2019/0067664 A1 | 2/2019 | Kwak | |

FOREIGN PATENT DOCUMENTS

| | | |
|---|---|---|
| CN | 207925531 U | 9/2018 |
| CN | 208478390 U | 2/2019 |
| CN | 212934729 U | 4/2021 |
| CN | 216450732 U | 5/2022 |
| CN | 218070012 U | 12/2022 |
| CN | 115692960 A | 2/2023 |

OTHER PUBLICATIONS

The First Office from corresponding Chinese Application No. 202310091080.5, dated Apr. 28, 2023. English translation attached.
The Grant Notice from corresponding Chinese Application No. 202310091080.5, dated May 17, 2023. English translation attach.

* cited by examiner

END COVER ASSEMBLY, ENERGY STORAGE APPARATUS, AND ELECTRIC DEVICE

CROSS-REFERENCE TO RELATED APPLICATIONS

The application claims priority to Chinese Patent Application No. 202310091080.5, filed on Feb. 9, 2023, which is hereby incorporated by reference in its entirety.

FIELD

The present disclosure relates to the field of electronics, and in particular, to an end cover assembly, an energy storage apparatus, and an electric device.

BACKGROUND

After an energy storage apparatus (such as a secondary battery) is prepared, during transportation or use, for example, when the energy storage apparatus falls, an explosion-proof valve may cause an error trigger, thereby affecting a service life of the energy storage apparatus.

SUMMARY

A first aspect of the present disclosure provides an end cover assembly applied in an energy storage apparatus. The energy storage apparatus includes an electrode assembly. The end cover assembly includes a top cover, an explosion-proof sheet, and a shielding member. The top cover has a first surface and a second surface. The top cover further has an explosion-proof hole through the first surface and the second surface. The top cover has a length direction and a width direction. A length of the top cover in the length direction is greater than a length of the top cover in the width direction. The explosion-proof sheet is configured to seal the explosion-proof hole and is connected to the top cover. The shielding member is located at a side of the explosion-proof sheet close to the second surface and connected to the top cover. The top cover, the explosion-proof sheet, and the shielding member form a chamber. The shielding member has a plurality of first air vents. The plurality of first air vents is arranged at intervals in a peripheral side wall of the shielding member. The plurality of first air vents is in communication with the chamber and a space where the electrode assembly of the energy storage apparatus is located. The plurality of first air vents includes a first group of first air vents and a second group of first air vents. A first air vent in the first group of first air vents extends in the length direction of the top cover, and a first air vent in the second group of first air vents extends in the width direction of the top cover. The shielding member includes a first connection portion, a first bent portion, a shielding portion, a second bent portion, and a second connection portion that are sequentially bent and connected to each other. The first connection portion and the shielding portion are respectively located at two opposite sides of the first bent portion. The first bent portion and the second bent portion are located at one side of the shielding portion, and the shielding portion and the second connection portion are respectively located at two opposite sides of the second bent portion. The shielding portion and the explosion-proof sheet are spaced apart from each other, and the first connection portion and the second connection portion are spaced apart from each other in the length direction of the top cover. Each of the first connection portion and the second connection portion are connected to the second surface of the top cover. The first connection portion includes a first body portion and a first protrusion portion connected to the first body portion. The first body portion is connected to the second surface of the top cover, and the first protrusion portion protrudes from a side of the first body portion facing away from the top cover. The second connection portion includes a second body portion and a second protrusion portion connected to the second body portion. The second body portion is connected to the second surface of the top cover, and the second protrusion portion protrudes from a side of the second body portion facing away from the top cover. A ratio of a length W1 of the first air vent in the first group of first air vents in the length direction of the top cover to a maximum length D1 of the explosion-proof sheet in the length direction of the top cover ranges from 0.8 to 1.2, and a ratio of a length W2 of the first air vent in the second group of first air vents in the width direction of the top cover to a length D2 of the explosion-proof sheet in the width direction of the top cover ranges from 0.7 to 1.3.

A second aspect of the present disclosure further provides an energy storage apparatus, including: the end cover assembly according to the embodiments of the present disclosure, an adapter sheet, and au electrode assembly. The adapter sheet is arranged at a side of a top cover facing away from a first surface. The adapter sheet has an end electrically connected to the end cover assembly. The electrode assembly is arranged at a side of the adapter sheet facing away from the end cover assembly and electrically connected to an end of the adapter sheet away from the end cover assembly.

A third aspect of the present disclosure further provides an electric device, including: an electric device body, and the energy storage apparatus according to the embodiments of the present disclosure. The energy storage apparatus is configured to supply power to the electric device body.

BRIEF DESCRIPTION OF THE DRAWINGS

In order to more clearly explain the technical solutions in the embodiments of the present disclosure, drawings needing to be used in the embodiments are briefly described below. Obviously, the drawings as described below are merely some embodiments of the present disclosure. Based on these drawings, other drawings can be obtained by those skilled in the art without creative labor.

Figure 1:
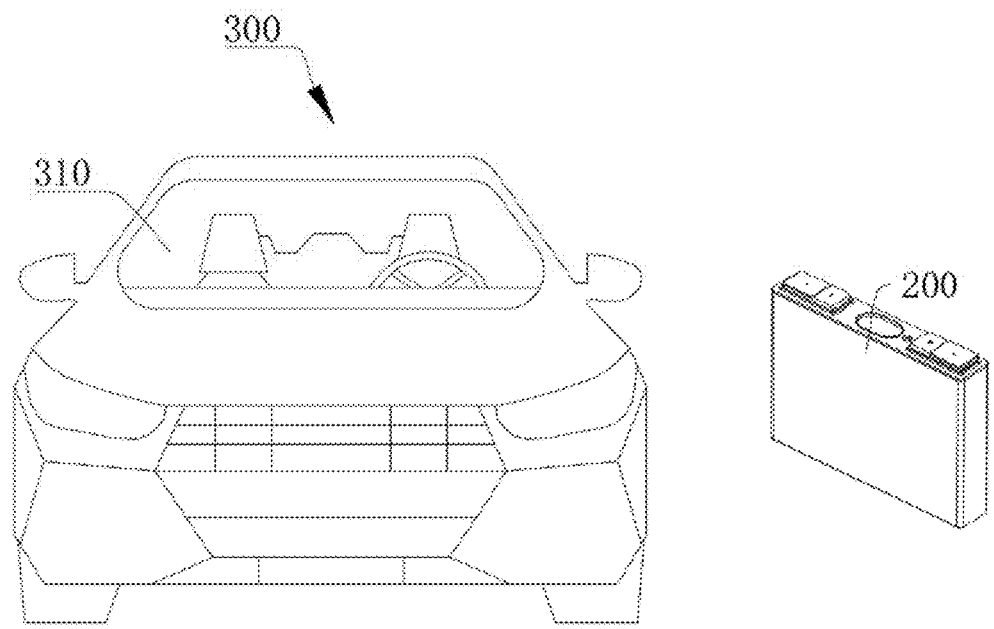
FIG. 1 is a schematic structural view of an electric device according to an embodiment of the present disclosure, in which an energy storage apparatus and an electric device body are in a separated state.

Reference numerals in the drawings are described below.

300—electric device, 310—electric device body, 200—energy storage apparatus, 210—electrode assembly, 211—positive electrode tab, 213—negative electrode tab, 230—adapter sheet, 231—positive adapter sheet, 233—negative adapter sheet, 250—housing, 100—end cover assembly, 10—top cover, 11—first surface, 13—second surface, 15—explosion-proof hole, 20—explosion-proof sheet, 23—protection sheet, 30—shielding member, 31—chamber, 33—first air vent, 33a—first group of first air vents, 33b—second group of first air vents, 34—first connection portion, 341—first body portion, 343—first protrusion portion, 35—first bent portion, 351—first guide inclined surface, 353—second guide inclined surface, 36—shielding portion, 361—second air vent, 37—second bent portion, 371—third guide inclined surface, 373—fourth guide inclined surface, 38—second connection portion, 381—second body portion, 383—second protrusion portion, 50—lower plastic member, 51—air-permeable flow channel, 511—first air-permeable sub-flow channel, 512—second air-permeable sub-flow channel, 513—third air-permeable sub-flow channel, 514—fourth air-permeable sub-flow channel, 515—fifth air-permeable sub-flow channel, 53—third air vent, 54—fourth air vent, 55—first plastic sub-member, 56—second plastic sub-member, 57—third plastic sub-member, 571—first plastic body portion, 572—first snap portion, 573—second snap portion, 58—fourth plastic sub-member, 581—second plastic body portion, 582—third snap portion, 583—fourth snap portion, 41—positive metal pressing block, 43—negative metal pressing block, 61—positive upper plastic member, 63—negative upper plastic member, 71—positive pole, 73—negative pole.

DETAILED DESCRIPTION

In order to enable a person skilled in the art to better understand the solutions of the present disclosure, technical solutions according to embodiments of the present disclosure will be described clearly and completely below in combination with accompanying drawings of the embodiments of the present disclosure. Obviously, the embodiments described below are only a part of the embodiments of the present disclosure, rather than all embodiments of the present disclosure. On a basis of the embodiments of the present disclosure, all other embodiments obtained by those skilled in the art without creative labor shall fall within the protection scope of the present disclosure.

It should be noted that terms "first" and "second" in the specification and claims of the present disclosure are used to distinguish different objects, rather than to describe an exemplary sequence. In addition, terms "include", "have", and any variations thereof are intended to cover non-exclusive inclusions. For example, a process, a method, a system, a product, or a device that includes a series of steps or units is not limited to those clearly listed steps or units, but optionally further includes steps or units that are not listed, or optionally further includes steps or units that are inherent to the process, the method, the product, or the device.

The technical solutions in the embodiments of the present disclosure will be described below with reference to the accompanying drawings.

It should be noted that, for ease of description, in the embodiments of the present disclosure, the same reference numbers refer to the same components. Moreover, in different embodiments, detailed descriptions of the same components are omitted for simplicity.

After preparation of an energy storage apparatus (such as a secondary battery) is completed, accidents often occur during transportation or use. For example, when the energy storage apparatus falls, an explosion-proof valve may cause an accident triggering, thereby affecting normal use and safety of the energy storage apparatus.

In addition, cases of unintentional drops often occur. When the energy storage apparatus falls, an electrolyte impacts an explosion-proof sheet on an end cover assembly, further exerting a significant impact force on the explosion-proof sheet. In this way, mechanical strength of the explosion-proof sheet is easily influenced. The explosion-proof sheet is triggered without reaching its trigger pressure during subsequent use and even is directly triggered to explode in severe case, thereby affecting the normal use of the energy storage apparatus.

Referring to FIG. 1, an embodiment of the present disclosure provides an electric device 300, which includes an electric device body 310 and an energy storage apparatus 200. The energy storage apparatus 200 is configured to supply power to the electric device body 310.

The electric device 300 in the embodiments of the present disclosure can be, but is not limited to, a portable electronic device such as a mobile phone, a tablet computer, a laptop, a desktop computer, a smart bracelet, a smartwatch, an electronic reader, and a gaming machine. The electric device 300 can also be a car, a truck, a sedan, a van, a freight car, a bullet train, a high-speed rail, an electric automatic vehicle, and other vehicles. In addition, the electric device 300 can also be various household appliances. It can be understood that the electrical device 300 shown in the drawings of the present disclosure is merely one of forms of the electrical device 300, and should not be understood as a limitation on the electrical device 300 provided in the present disclosure.

Figure 2:
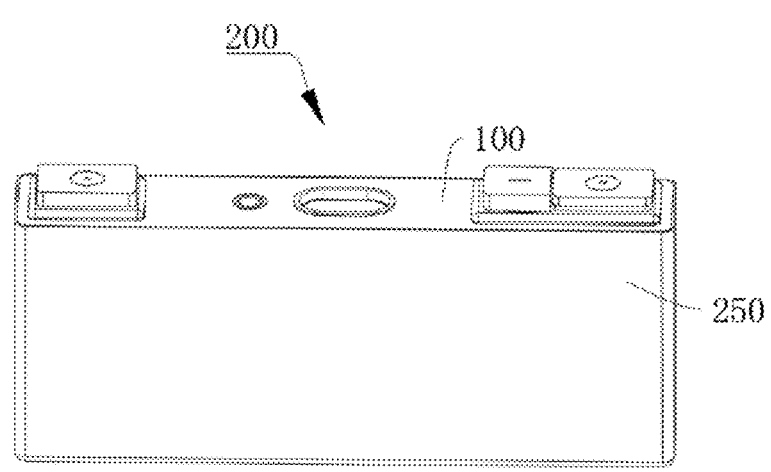
FIG. 2 is a schematic structural view of an energy storage apparatus according to an embodiment of the present disclosure.
Figure 3:
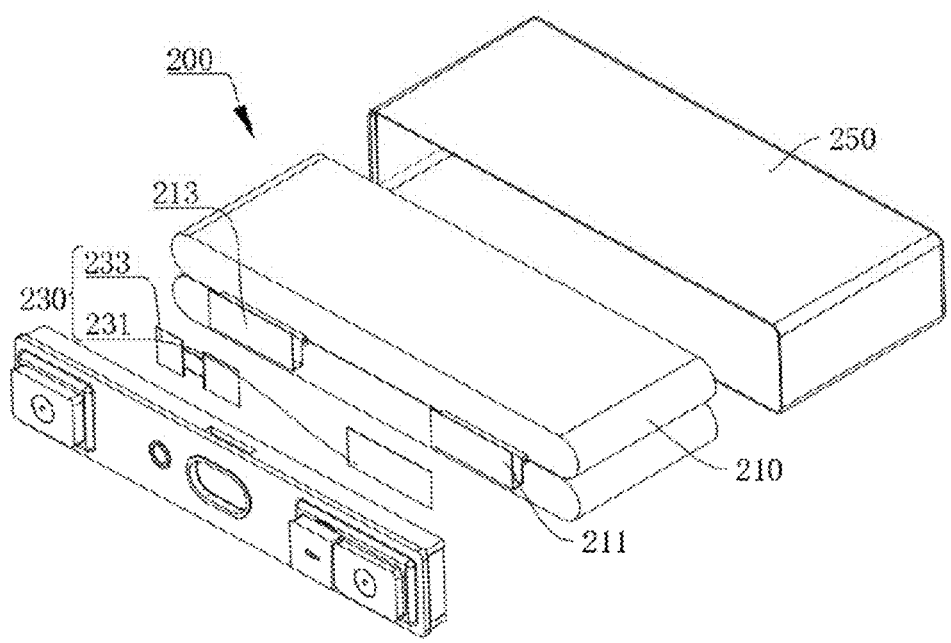
FIG. 3 is a schematic exploded structural view of au energy storage apparatus according to an embodiment of the present disclosure.
Figure 4:
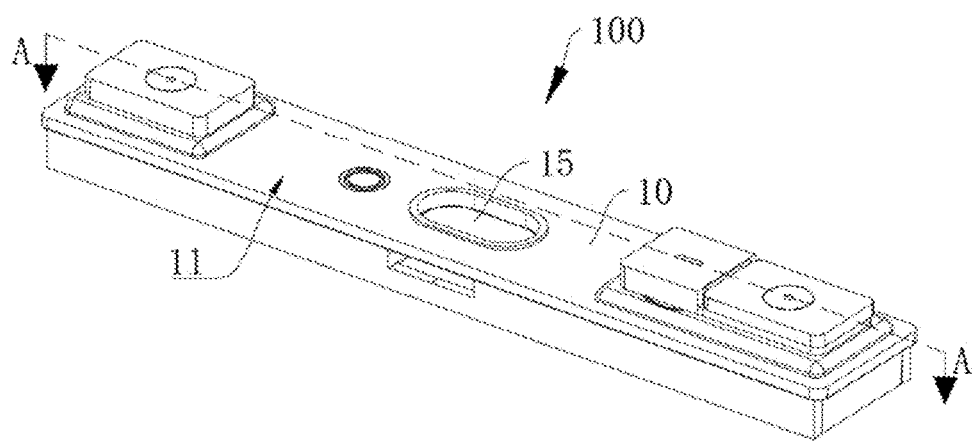
FIG. 4 is a schematic structural view of an end cover assembly according to an embodiment of the present disclosure.
Figure 5:
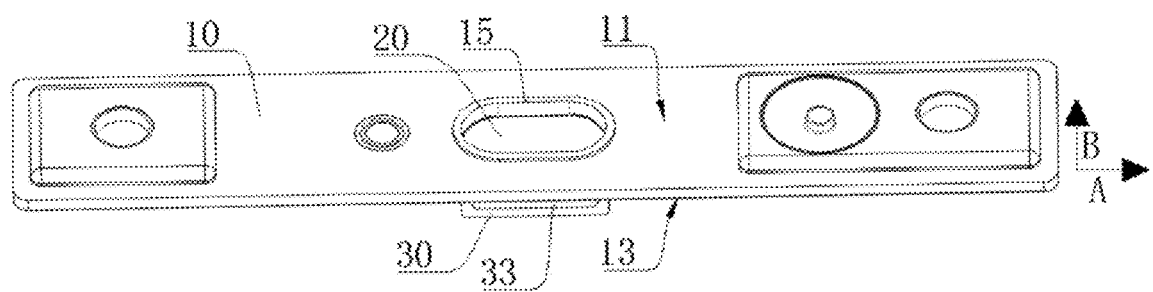
FIG. 5 is a schematic structural view after assembly of a top cover, an explosion-proof sheet, and a shielding member according to an embodiment of the present disclosure.
Figure 6:
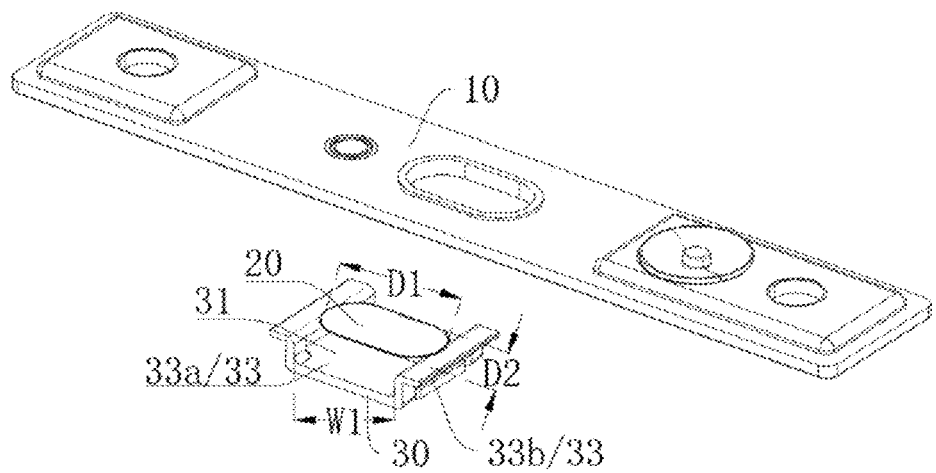
FIG. 6 is a schematic structural view of another viewing angle prior to the assembly of the top cover, the explosion-proof sheet, and the shielding member according to the embodiment of the present disclosure of FIG. 5.

Referring to FIG. 2 and FIG. 3, an embodiment of the present disclosure also provides an energy storage apparatus 200, which includes: an electrode assembly 210, an adapter sheet 230, and an end cover assembly 100. The adapter sheet 230 is electrically connected to the electrode assembly 210. The end cover assembly 100 is arranged at a side of the adapter sheet 230 facing away from the electrode assembly 210 and is electrically connected to the adapter sheet 230.

The energy storage apparatus 200 in the embodiments of the present disclosure can be applied in, but is not limited to, an energy storage apparatus 200 applied in a lithium-ion secondary battery, a lithium-ion one-shot battery, a lithium sulphur battery, a sodium lithium ion battery, a sodium ion battery or a magnesium ion battery, an energy storage battery, and the like. It can be understood that the energy storage apparatus 200 shown in the drawings of the present disclosure is merely the one of the forms of the energy storage apparatus 200, and should not be understood as limiting the energy storage apparatus 200 provided in the present disclosure.

In an embodiment, the adapter sheet 230 can be, but is not limited to, at least one of a copper foil and an aluminum foil.

In an embodiment, the adapter sheet 230 includes a positive adapter sheet 231 and a negative adapter sheet 233. The electrode assembly 210 includes a positive electrode plate (not shown I), a separator (not shown), and a negative electrode plate (not shown) that are arranged sequentially. The positive electrode plate and the negative electrode plate are each electrically connected to the end cover assembly 100 through the adapter sheet 230. The positive electrode plate includes a positive electrode current collector, a positive electrode tab 211 electrically connected to the positive electrode current collector, and a positive electrode active layer arranged on a surface of the positive electrode current collector. The positive electrode plate is electrically connected to the positive adapter sheet 231 through the positive electrode tab 211. The negative electrode plate includes a negative electrode current collector, a negative electrode tab 213 electrically connected to the negative electrode current collector, and a negative electrode active layer arranged on a surface of the negative electrode current collector. The negative electrode plate is electrically connected to the negative adapter sheet 233 through the negative electrode tab 213.

It can be understood that the positive adapter sheet 231 and the negative adapter sheet 233 are different adapter sheets and are used for electrically connecting the positive electrode tab 211 to the adapter sheet 230 of the end cover assembly 100 as the positive adapter sheet 231; and for electrically connecting the negative electrode tab 213 to the adapter sheet 230 of the end cover assembly 100 as the negative adapter sheet 233.

In some embodiments, the energy storage apparatus 200 of the present disclosure also includes a housing 250. The housing 250 is connected to the end cover assembly 100. The housing 250 and the end cover assembly 100 form an accommodation groove. The accommodation groove is used for accommodating the electrode assembly 210 and the adapter sheet 230.

In some embodiments, the energy storage apparatus 200 of the present disclosure also includes an electrolyte (not shown). The electrolyte is accommodated in the accommodation groove. Each of the positive electrode plate and the negative electrode plate is at least partially infiltrated by the electrolyte.

After the preparation of the energy storage apparatus (such as the secondary battery) is completed, careless drops often occur during transportation or use. When the energy storage apparatus is subjected to falls, vibrations, or impacts, the electrolyte impacts the explosion-proof sheet on the end cover assembly, further exerting the significant impact force on the explosion-proof sheet. In this way, the mechanical strength of the explosion-proof sheet is easily affected. The explosion-proof sheet is triggered without reaching its trigger pressure during subsequent usage and even is directly triggered to explode in severe case, thereby affecting the normal use of the energy storage apparatus.

Referring to FIG. 4 to FIG. 7, an embodiment of the present disclosure also provides an end cover assembly 100, applied in the energy storage apparatus 200. The end cover assembly 100 includes a top cover 10, an explosion-proof sheet 20, and a shielding member 30. The top cover 10 has a first surface 11 and a second surface 13 opposite to the first surface 11. The top cover 10 also has an explosion-proof hole 15 through the first surface 11 and the second surface 13. The top cover 10 has a length direction (as illustrated in an arrow A of FIG. 5) and a width direction (as illustrated in an arrow B of FIG. 5). A length of the top cover 10 in the length direction is greater than a length of the top cover in the width direction. The explosion-proof sheet 20 is configured to seal the explosion-proof hole 15 and is connected to the top cover 10. The shielding member 30 is located at a side of the explosion-proof sheet 20 close to the second surface 13 and is connected to the top cover 10. The top cover 10, the explosion-proof sheet 20, and the shielding member 30 form a chamber 31. The shielding member 30 has a plurality of first air vents 33. The plurality of first air vents 33 is arranged at intervals along a peripheral side wall of the shielding member 30. The plurality of first air vents 33 is in communication with the chamber 31. When the end cover assembly 100 is applied in an energy storage apparatus 200, the plurality of first air vents 33 is in communication with a space where the electrode assembly 210 of the energy storage apparatus 200 is located. The plurality of first air vents 33 includes a first group of first air vents 33a and a second group of first air vents 33b. A first air vent 33 in the first group of first air vents 33a extends in the length direction of the top cover 10, and a first air vent 33 in the second group of first air vents 33b extends in the width direction of the top cover 10. A ratio of a length W1 of the first air vent 33 in the first group of first air vents 33a in the length direction of the top cover 10 to a maximum length D1 of the explosion-proof sheet 20 in the length direction of the top cover ranges from 0.8 to 1.2. A ratio of a length W2 of the first air vent 33 in the second group of first air vents 33b in the width direction of the top cover 10 to a length D2 of the explosion-proof sheet 20 in the width direction of the top cover ranges from 0.7 to 1.3.

It should be noted that, when the end cover assembly 100 is applied in the energy storage apparatus 200, the first surface 11 is closer to an appearance surface of the energy storage apparatus 200 than the second surface 13. In other words, the second surface 13 is closer to the electrode assembly 210 of the energy storage apparatus 200 than the first surface 11.

It can be understood that the space where the electrode assembly 210 is located is the accommodation groove for providing the electrode assembly 210 and the electrolyte.

In an embodiment, the first group of first air vents 33a includes one or more first air vents 33. When the first group of first air vents 33a includes the plurality of first air vents 33, each of the plurality of first air vents 33 extends in the length direction of the top cover 10, and the plurality of first air vents 33 is arranged at intervals in the width direction of the top cover 10. The second group of first air vents 33b includes one or more first air vents 33. When the second group of first air vents 33b includes the plurality of first air vents 33, each of the plurality of first air vents 33 extends in the width direction of the top cover 10, and the plurality of first air vents 33 is arranged at intervals in the length direction of the top cover 10.

In an embodiment, the ratio of the length W1 of the first air vent 33 in the first group of first air vents 33a in the length direction of the top cover 10 to the maximum length D1 of the explosion proof sheet 20 in the length direction of the top cover can be, but not limited to, 0.8, 0.85, 0.9, 0.95, 1.0, 1.1, or 1.2. When the ratio of W1 to D1 is too small, a speed of an inflow of airflow inside the energy storage apparatus 200 into the chamber 31 through the first air vent 33 is too slow. When internal pressure of the energy storage apparatus 200 reaches explosion pressure of the explosion-proof sheet 20, a response speed of the explosion-proof sheet 20 is lowered, and a risk of explosion of the energy storage apparatus 200 is improved. When the ratio of W1 to D1 is too large, the energy storage apparatus 200 is impacted or has an increase in internal pressure. In this way, a shielding effect of the shielding member 30 on the airflow and the electrolyte is lowered, which increases a risk of accident triggering of the explosion-proof sheet 20 in advance. In addition, a height of the shielding member 30 is increased, thereby increasing a thickness of the end cover assembly 100, which is not conducive to improving the energy density of the energy storage apparatus 200.

In an embodiment, the ratio of the length W2 of the first air vent 33 in the second group of first air vents 33b in the width direction of the top cover 10 to the length D2 of the explosion-proof sheet 20 in the width direction of the top cover can be, but not limited to, 0.7, 0.8, 0.85, 0.9, 0.95, 1.0, 1.1, 1.2, or 1.3. When the ratio of W2 to D2 is too small, the speed of the inflow of the airflow in the energy storage apparatus 200 into the chamber 31 through the first air vent 33 is too slow. When the internal pressure of the energy storage apparatus 200 reaches the explosion pressure of the explosion-proof sheet 20, the response speed of the explosion-proof sheet 20 is reduced, thereby decreasing the risk of explosion of the energy storage apparatus 200. When the ratio of W1 to D1 is too large, the energy storage apparatus 200 is impacted or has an increase in internal pressure. In this way, the shielding effect of the shielding member 30 on the airflow and the electrolyte is reduced, which increases the risk of the accident triggering of the explosion-proof sheet 20 in advance. In addition, the height of the shielding member 30 is increased and thus the thickness of the end cover assembly 100 is increased, which is not conducive to improving the energy density of the energy storage apparatus 200.

The end cover assembly 100 according to the embodiments of the present disclosure includes the top cover 10, the explosion-proof sheet 20, and the shielding member 30. The shielding member 30 is located at the side of the explosion-proof sheet 20 close to the second surface 13 and is connected to the top cover 10. The shielding member 30 is provided below the explosion proof sheet 20, allowing the end cover assembly 100 to be applied in the energy storage apparatus 200. Moreover, when the energy storage apparatus 200 is subjected to impacts, falls, or vibrations, and when the electrolyte in the energy storage apparatus 200 impacts the end cover assembly 100 in a direction facing towards the end cover assembly 100, due to shielding of the shielding member 30, the electrolyte firstly impacts the shielding member 30. In this way, the direct impact of the electrolyte on the explosion-proof sheet can be greatly buffered, and the accident triggering caused by the impact of the electrolyte on the explosion-proof sheet 20 can be effectively avoided. In addition, by providing the shielding member 30, a gap between the top cover 10 and a lower plastic member arranged below the top cover 10 is reduced. In this case, when the energy storage apparatus 200 vibrates and the top cover 10 inadvertently impacts a fence of the lower plastic member corresponding to the position of the explosion-proof sheet 20, an impact force of the top cover 10 on the fence is reduced, thereby decreasing the risk of fence fracture. Further, by providing the first air vent 33, which is in communication with the chamber 31, on the shielding member 30, when the end cover assembly 100 is applied in the energy storage apparatus 200, the chamber 31 can be in communication with the space where the electrode assembly 210 of the energy storage apparatus 200 is located without affecting the function of the explosion-proof sheet 20 itself. Furthermore, by arranging the first air vent 33 at a position of the shielding member 30 close to a periphery of the explosion-proof sheet 20, when the end cover assembly 100 is applied in the energy storage apparatus 200 and internal air pressure of the energy storage apparatus 200 increases, the explosion-proof sheet 20 can be prevented from being directly impacted by the airflow, allowing for more even pressure distribution on each position of the explosion-proof sheet 20. Moreover, the design of explosion pressure is more accurate during design of the explosion-proof sheet 20. Furthermore, the plurality of first air vents 33 is arranged at intervals along an outer peripheral wall of the shielding member 30. In this way, when the end cover assembly 100 is applied in the energy storage apparatus 200 and the internal air pressure of the energy storage apparatus 200 increases, the explosion-proof sheet 20 can be prevented from being directly impacted by the airflow, thereby achieving more even pressure distribution on each position of the explosion-proof sheet 20. In addition, when the explosion-proof sheet 20 is designed, the design of the explosion pressure is more accurate. Furthermore, by controlling $0.8 \leq W1/D1 \leq 1.2$ and $0.7 \leq W1/D2 \leq 1.3$, it is possible to better ensure that a gas generated by the space where the electrode assembly 210 is located can smoothly enter the chamber 31 without affecting the explosion of the explosion-proof sheet 20. In this way, the gas of the electrode assembly 210 can also be ensured to enter the explosion-proof valve from different directions while the shielding member 30 protects against the electrolyte, thereby improving the safety of the energy storage apparatus 200.

In an embodiment, the explosion-proof sheet 20 has a score (not shown). When the end cover assembly 100 is applied in the energy storage apparatus 200 and the air pressure in the energy storage apparatus 200 reaches a predetermined value, the explosion-proof sheet 20 ruptures or bursts, thereby releasing pressure from the energy storage apparatus 200. In this way, a further increase in internal pressure of the energy storage apparatus 200 is prevented from causing the risk of explosion.

In an embodiment, the explosion-proof sheet 20 is located in the explosion-proof hole 15. The explosion-proof sheet 20 is closer to the second surface 13 than the first surface 11.

In some embodiments, the shielding member 30 has four first air vents 33. Two of the four first air vents 33 are spaced apart from each other in the length direction of the top cover 10 and extend in the width direction of the top cover 10, and another two of the four fast air vents 33 are spaced apart from each other in the width direction of the top cover 10 and extend in the length direction of the top cover 10. A cross-sectional area of each of the other two of the four first air vents 33 arranged in the width direction of the top cover 10 is greater than a cross-sectional area of each of the two of the four first air vents 33 arranged in the length direction of the top cover 10.

In an exemplary embodiment, the two first air vents 33, spaced apart from each other in the length direction, have the same cross-sectional area; and the other two fast air vents 33, spaced apart from each other in the width direction, have the same cross-sectional area.

It can be understood that the top cover 10 also has a thickness direction. The length of the width direction is greater than a height in the thickness direction.

It can be understood that the length direction and the width direction are each perpendicular to a lamination direction of the top cover 10 and the shielding member 30, i.e., the length direction and the width direction are each perpendicular to the thickness direction of the top cover 10.

In an embodiment, a ratio of the cross-sectional area S1 of each of the two of the four first air vents 33 arranged in the length direction of the top cover 10 (in other words, a cross-sectional area S1 of the first air vent 33 extending in the width direction of the top cover 10) to the cross-sectional area S2 of each of the other two of the four first air vents 33 arranged in the width direction of the top cover 10 (in other words, a cross-sectional area S2 of the first air vent 33 arranged in the length direction of the top cover 10) ranges from 1.18 to 1.76. Specifically, S2/S1 can be, but is not limited to, 1.18, 1.2, 1.25, 1.3, 1.36, 1.4, 1.45, 1.5, 1.55, 1.6, 1.65, 1.7, or 1.76. The ratio of S2 to S1 is too large, allowing an air inflow amount of the first air vent 33 located in the width direction of the top cover 10 to be much greater than an air inflow amount of the first air vent 33 located in the length direction of the top cover 10. In this way, when the internal pressure of the energy storage apparatus 200 increases, a pressure difference on the explosion-proof sheet 20 from different directions becomes excessively large, leading to an explosion of the explosion-proof sheet 20 in advance and impacting the normal use of the energy storage apparatus 200. When $1.18 \leq S2/S1 \leq 1.76$, it is possible to make airflow flowing into the chamber 31 from various directions more uniform when the internal pressure of the energy storage apparatus 200 increases. In this way, the pressure on the explosion-proof sheet 20 from various directions is more balanced, thereby avoiding the explosion of the explosion-proof sheet 20 in advance and improving a service life of the energy storage apparatus 200.

In an embodiment, the cross-sectional area S1 of the first air vent 33 arranged in the length direction of the top cover 10 ranges from 51 $mm^2$ to 91.5 $mm^2$. Specifically, the cross-sectional area S1 of the first air vent 33 arranged in the length direction of the top cover 10 can be, but is not limited to, 51 $mm^2$, 55 $mm^2$, 60 $mm^2$, 65 $mm^2$, 70 $mm^2$, 75 $mm^2$, 801 $nm^2$, 85 $mm^2$, 88 $mm^2$, 91.5 $mm^2$, and the like. When the cross-sectional area S1 of the first air vent 33 arranged in the length direction of the top cover 10 is too small, the speed of the inflow of the airflow in the energy storage apparatus 200 into the chamber 31 through the first air vent 33 is too slow. When the internal pressure of the energy storage apparatus 200 reaches the explosion pressure of the explosion-proof sheet 20, the response speed of the explosion-proof sheet 20 is lowered, which decreases the risk of explosion of the energy storage apparatus 200. When the cross-sectional area S1 of the first air vent 33 arranged in the length direction of the top cover 10 is too large, the energy storage apparatus 200 is subjected to impact or has an increase in the internal pressure. In this way, the shielding effect of the shielding member 30 on the airflow and the electrolyte is reduced, which increase the risk of accident triggering of the explosion-proof sheet 20 in advance. In addition, the height of the shielding member 30 is increased, and the thickness of the end cover assembly 100 is increased, which is not conducive to improving the energy density of the energy storage apparatus 200.

In an embodiment, the cross-sectional area S2 of the first air vent 33 arranged in the width direction of the top cover 10 ranges from 60 $mm^2$ to 108 $mm^2$. Specifically, the cross-sectional area S2 of each of the first air vent 33 arranged in the width direction of the top cover 10 can be, but is not limited to, 60 $mm^2$, 65 $mm^2$, 70 $mm^2$, 75 $mm^2$, 80 $mm^2$, 85 $mm^2$, 88 $mm^2$, 91.5 $mm^2$, 95 $mm^2$, 100 $mm^2$, 104 $mm^2$, 108 $mm^2$, and the like. When the cross-sectional area S2 of the first air vent 33 arranged in the width direction of the top cover 10 is too small, the speed of the inflow of the airflow in the energy storage apparatus 200 into the chamber 31 through the first air vent 33 is too slow. When the internal pressure of the energy storage apparatus 200 reaches the explosion pressure of the explosion-proof sheet 20, the response speed of the explosion-proof sheet 20 is reduced, which decreases the risk of explosion of the energy storage apparatus 200. When the cross-sectional area S2 of the first air vent 33 arranged in the width direction of the top cover 10 is too large, the energy storage apparatus 200 is subjected to impact or has an increase in the internal pressure. In this way, the shielding effect of the shielding member 30 on the airflow and the electrolyte is reduced, which increases the risk of the accident triggering of the explosion-proof sheet 20 in advance. In addition, the height of the shielding member 30 is increased, thereby increasing the thickness of the end cover assembly 100. Therefore, which is not conducive to improving the energy density of the energy storage apparatus 200.

Figure 7:
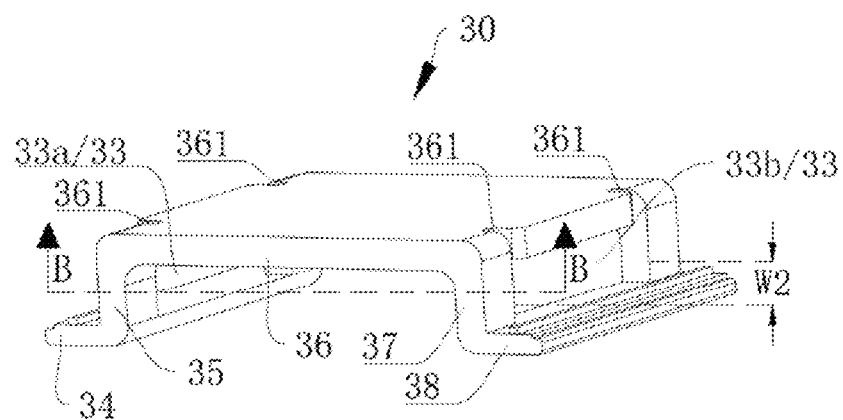
FIG. 7 is a schematic structural view of a shielding member according to an embodiment of the present disclosure.

Referring to FIG. 7, in some embodiments, the shielding member 30 includes a first connection portion 34, a first bent portion 35, a shielding portion 36, a second bent portion 37, and a second connection portion 38 that are sequentially bent and connected to each other. The first connection portion 34 and the shielding portion 36 are respectively located at two opposite sides of the first bent portion 35. The first bent portion 35 and the second bent portion 37 are located at one side of the shielding portion 36. The shielding portion 36 and the second connection portion 38 are respectively located at two opposite sides of the second bent portion 37. The shielding portion 36 shielding portion 36 is spaced apart from the explosion-proof sheet 20. The first connection portion 34 and the second connection portion 38 are spaced apart from each other in the length direction of the top cover 10 and are connected to the second surface 13 of the top cover 10, respectively. The first connection portion 34, the first bent portion 35, the shielding portion 36, the second bent portion 37, the second connection portion 38, and the top cover 10 form the first group of first air vents 33a. The first group of first air vents 33a includes two first air vents 33 spaced apart from each other in the width direction of the top cover 10. The first bent portion 35 and the second bent portion 37 each have the plurality of first air vents 33. The shielding portion 36 can block the direct impact of the electrolyte caused by shaking of the electrolyte when the air pressure in the energy storage apparatus 200 increases or the energy storage apparatus 200 is impacted. The first air vent 33 is located at a side surface of the shielding member 30 (i.e., the peripheral side wall of the shielding member 30), thereby allowing air pressure in the chamber 31 to be more balanced and the explosion of the explosion-proof sheet 20 to be more accurate.

It can be understood that each of the four first air vents 33, which is formed by the shielding member 30 and the top cover 10, is located at the peripheral side wall of the shielding member 30.

In an embodiment, the shielding member 30 is integrally formed. In other words, the first connection portion 34, the first bent portion 35, the shielding portion 36, the second bent portion 37, and the second connection portion 38 are integrally formed and are different parts of the same component. The shielding member 30 may be formed by integral molding processes such as stamping.

In an exemplary embodiment, the first connection portion 34 and the second connection portion 38 are welded to the second surface 13 of the top cover 10 by welding.

Figure 8:
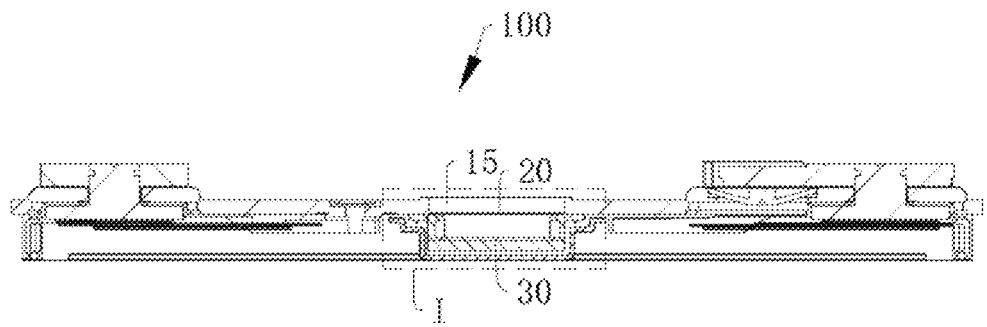
FIG. 8 is a schematic cross-sectional and structural view, taken in a direction A-A in FIG. 4, of an end cover assembly according to an embodiment of the present disclosure.
Figure 9:
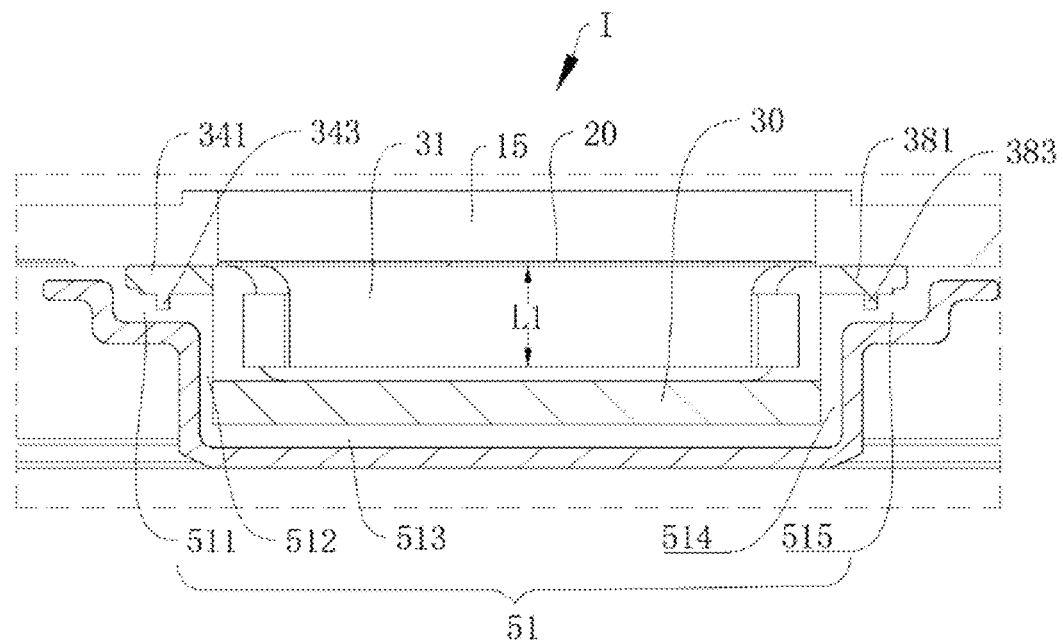
FIG. 9 is an enlarged view of a dashed box I in FIG. 8.

Referring to FIG. 8 and FIG. 9, in an embodiment, a distance L1 between the shielding portion 36 and the explosion-proof sheet 20 ranges from 3.31 mm to 7.34 mm. Specifically, the distance L1 between the shielding portion 36 and the explosion-proof sheet 20 can be, but is not limited to, 3.31 mm, 4 mm, 4.5 mm, 5 mm, 5.5 mm, 6 mm, 6.5 mm, 7 mm, 7.34 mm, and the like. The distance L1 between the shielding portion 36 and the explosion-proof sheet 20 too small. A chamber 31 defined between the shielding member 30 and the explosion-proof sheet 20 is too small. A cross-sectional area of the first air vent 33 that can be defined by the first bent portion 35 and the second bent portion 37 is too small. In this case, the speed of the inflow of the airflow in the energy storage apparatus 200 into the chamber 31 through the first air vent 33 becomes too slow. When the internal pressure of the energy storage apparatus 200 reaches the explosion pressure of the explosion-proof sheet 20, the response speed of the explosion-proof sheet 20 is reduced, thereby improving the risk of explosion of the energy storage apparatus 200. When the distance L1 between the shielding portion 36 and the explosion-proof sheet 20 is too large, the thickness of the end cover assembly 100 is increased, which is not conducive to improving the energy density of the energy storage apparatus 200.

In an embodiment, a surface of the shielding member 30 facing away from the top cover 10 has an identity identification code, i.e., a surface of the shielding portion 36 facing away from the top cover 10 has the identity identification code. The surface of the shielding portion 36 facing away from the top cover 10 is a flat surface, which is smooth. By providing the identity identification code on the surface of the shielding portion 36 facing away from the top cover 10, it is convenient to perform traceability on a product. Moreover, it is possible to prevent an outer surface of the identity identification code located outside the energy storage apparatus 200 from being touched and scratched by an adjacent energy storage apparatus 200 (i.e., a battery module) or other foreign matter.

In an embodiment, the identity identification code includes at least one of a QR code, a barcode, a verification code, a serial number, and the like, which represent encoding information of an identity of the product.

In some embodiments, when the end cover assembly 100 is applied in the energy storage apparatus 200, a minimum spacing L2 between a surface of a shielding member 30 facing away from the top cover 10 and the electrode assembly 210 ranges from 1.4 mm to 5.8 mm, i.e., a minimum spacing L2 between the surface of the shielding portion 36 facing away from the top cover 10 and the electrode assembly 210 ranges from 1.4 mm to 5.8 mm. Specifically, the minimum spacing L2 between the surface of the shielding member 30 facing away from the top cover 10 and the electrode assembly 210 can be, but is not limited to, 1.4 mm, 1.6 mm, 1.8 mm, 2.0 mm, 2.2 mm, 2.4 mm, 2.6 mm, 2.8 mm, and the like. It is not desirable for the shielding member 30 to be too close to the electrode assembly 210. In response that the distance between the shielding member 30 and the electrode assembly 210 is too close, when the electrolyte flowing to the chamber 31 reflexes into the space where the electrode assembly 210 is located, a part of the electrode assembly 210 located in a middle of the shielding member 30 cannot be fully immersed in the electrolyte. Moreover, lithium ions in a middle part of the electrode assembly 210 have the highest activity, which is not conducive to improving an infiltration effect of the electrolyte on the electrode assembly 210, and thus is not conducive to fully utilizing the capacity of the energy storage apparatus 200.

Figure 10:
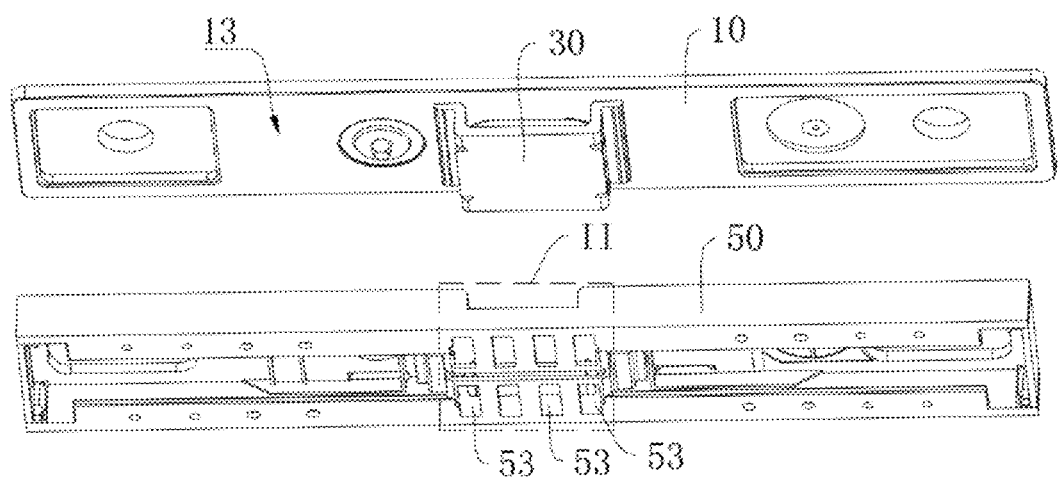
FIG. 10 is a schematic view of a partially exploded structure of an end cover assembly according to an embodiment of the present disclosure.

Referring to FIG. 9 and FIG. 10, in some embodiments, the first connection portion 34 includes a first body portion 341 and a first protrusion portion 343 connected to the first body portion 341. The first body portion 341 is connected to the second surface 13 of the top cover 10, and the first protrusion portion 343 protrudes from a side of the first body portion 341 facing away from the top cover 10. The second connection portion 38 includes a second body portion 381 and a second protrusion portion 383 connected to the second body portion 381. The second body portion 381 is connected to the second surface 13 of the top cover 10, and the second protrusion portion 383 protrudes from a side of the second body portion 381 facing away from the top cover 10. The end cover assembly 100 further includes a lower plastic member 50. The lower plastic member 50 is arranged at a side of the second surface 13 of the top cover 10 and is snapped to the shielding member 30. An air-permeable flow channel 51 is formed between the lower plastic member 50 and the shielding member 30 and in communication with the plurality of first air vents 33. An air-permeable flow channel 51, which is in communication with the chamber 31, is formed between the shielding member 30 and the lower plastic member 50, which facilitates an inflow of airflow in the space where the electrode assembly 210 is located to an area below the explosion-proof sheet 20. In addition, the air-permeable flow channel 51 can balance pressure of an inflow of the airflow in the energy storage apparatus 200 to the end cover assembly 100, which avoids uneven pressures of the airflow flowing from various directions to the chamber 31 below the explosion-proof sheet 20, thereby affecting accuracy of the explosion of the explosion-proof sheet 20. In addition, the first protrusion portion 343 is provided at the side of the first body portion 341 facing away from the top cover 10. The second protrusion portion 383 is provided at the side of the second body portion 381 facing away from the top cover 10. Each of the first protrusion portion 343 and the second protrusion portion 383 is located in the air-permeable flow channel 51. When the airflow in the space where the electrode assembly 210 is located flows to an area below the shielding portion 36 and flows along the air-permeable flow channel 51 towards a direction of the chamber 31, the first protrusion portion 343 and the second protrusion portion 383 can alter a direction of the airflow, allowing the airflow to flow through the first bent portion 35 and the second bent portion 37 more stably (in other words, when the airflow flows through the first protrusion portion 343 and the second protrusion portion 383, a ramp airflow can be formed). In this way, the airflow flowing to the area below the explosion-proof sheet 20 can be better avoided, thereby preventing a large amount of gas from directly impacting the explosion-proof sheet 20, and preventing the explosion-proof sheet 20 from being accidentally triggered in advance.

In an embodiment, the first body portion 341 and the first protrusion portion 343 are integrally formed, and the second body portion 381 and the second protrusion portion 383 are also integrally formed. In other words, the shielding member 30 is integrally formed; and the shielding member 30 may be formed through integral molding processes such as stamping.

It can be understood that, when the end cover assembly 100 is applied in the energy storage apparatus 200, the air-permeable flow channel 51 is in communication with a fluid pathway between the space where the electrode assembly 210 is located and the chamber 31.

Referring again to FIG. 7, in some embodiments, the shielding portion 36 has a second air vent 361. The second air vent 361 is in communication with the chamber 31, the plurality of first air vents 33, and the air-permeable flow channel 51, respectively. By defining the second air vent 361 at the shielding portion 36, when the energy storage apparatus 200 vibrates or is impacted, the electrolyte, when flowing to the chamber 31 below the explosion-proof sheet 20, can flow back into the space where the electrode assembly 210 is located through the second air vent 361, thereby avoiding a waste of the electrolyte. In addition, the shielding portion 36 has the second air vent 361. When the electrolyte flows back to the electrode assembly 210, a part of the electrode assembly 210 located below the shielding portion 36 may be better infiltrated, thereby allowing for better utilization of the middle part with the highest activity of the lithium ions on the electrode assembly 210. Further, the second air vent 361 can better equalize the airflow flowing from the air-permeable flow channel 51 to the chamber 31 below the explosion-proof sheet 20.

It can be understood that the second air vent 361 penetrates the shielding portion 36 in a thickness direction of the shielding portion 36. In other words, the second air vent 361 penetrates the shielding portion 36 in an arrangement direction or a lamination direction of the shielding portion 36 and the top cover 10.

In an embodiment, the second air vent 361 is located close to an outer periphery of the shielding portion 36. A number of the second air vents 361 can be one or more. When the shielding portion 36 has a plurality of second air vents 361, the plurality of second air vents 361 is arranged at intervals along the outer periphery of the shielding portion 36. In an exemplary embodiment, the shielding portion 36 has four second air vents 361. Two of the four second air vents 361 are spaced apart from each other, arranged at an end of the shielding portion 36, and in communication with one of the plurality of first air vents 33 in the length direction of the top cover 10. Another two of the four second air vents 361 are spaced apart from each other, arranged at another end of the shielding portion 36, and in communication with another one of the plurality of first air vents 33 in the length direction of the top cover 10. It can be understood that the two of the four second air vents 361 are spaced apart from each other at an end of the shielding portion 36 close to the first bent portion 35, and the other two of the four second air vents 361 are spaced apart from each other an end of the shielding portion 36 close to the second bent portion 37. By locating the second air vents 361 near the outer periphery of the shielding portion 36, it is possible to better prevent the pressure inside the space where the electrode assembly 210 is located from entering the air-permeable flow channel 51 and directly impacting the explosion-proof sheet 20 through the second air vent 361, thus avoiding the explosion of the explosion-proof sheet 20 in advance. Therefore, the normal use of the energy storage apparatus 200 is affected.

In an embodiment, the second air vent 361 penetrates a peripheral side surface of the shielding portion 36.

In an embodiment, the second air vent 361 has a cross-sectional area S3 ranging from 1 mm$^2$ to 5 mm$^2$. Specifically, the cross-sectional area S3 of the second air vent 361 can be, but is not limited to, 1 mm$^2$, 1.5 mm$^2$, 2 mm$^2$, 2.5 mm$^2$, 3 mm$^2$, 3.5 mm$^2$, 4 mm$^2$, 4.5 mm$^2$, 5 mm$^2$, and the like. The cross-sectional area of the second air vent 361 is too small. In this way, when the energy storage apparatus 200 vibrates or is impacted, and when the electrolyte flows to the chamber 31 below the explosion-proof sheet 20, the electrolyte is difficult to flow back into, through the second air vent 361, the space where the electrode assembly 210 is located. In this way, the electrolyte is easily caused to be left on the shielding member 30, resulting in the waste of the electrolyte, thereby affecting the capacity of the energy storage apparatus 200. The cross-sectional area of the second air vent 361 is too large. In this way, after the airflow in the space where the electrode assembly 210 of the energy storage apparatus 200 is located flows to the air-permeable flow channel 51, it is easy to directly impact the explosion-proof sheet 20 through the second air vent 361, causing the explosion-proof sheet 20 to be triggered in advance. Therefore, the normal use of the energy storage apparatus 200 is affected.

Further referring to FIG. 9, in some embodiments, the air-permeable flow channel 51 includes a first air-permeable sub-flow channel 511, a second air-permeable sub-flow channel 512, a third air-permeable sub-flow channel 513, a fourth air-permeable sub-flow channel 514, and a fifth air-permeable sub-flow channel 515 that are sequentially bent and in communication with each other. The first air-permeable sub-flow channel 511 and the third air-permeable sub-flow channel 513 are respectively located at two opposite sides of the second air-permeable sub-flow channel 512. The second air-permeable sub-flow channel 512 and the fourth air-permeable sub-flow channel 514 are located at one side of the third air-permeable sub-flow channel 513. The third air permeable sub-flow channel 513 and the fifth air-permeable sub-flow channel 515 are respectively located at two opposite sides of the fourth air-permeable sub-flow channel 514. The second air-permeable sub-flow channel 512 is in communication with the plurality of first air vents 33 of the first bent portion 35 and the second air vent 361 close to the first bent portion 35. The fourth air-permeable sub-flow channel 514 is in communication with the plurality of first air vents 33 of the second bent portion 37 and the second air vent 361 close to the second bent portion 37.

It can be understood that the air-permeable flow channel 51 is of a structure similar to the Chinese character "几" or "Ω".

In this embodiment, the air-permeable flow channel 51 having the structure similar to the Chinese character "几" or "Ω" is designed. In this way, when the airflow passes through the air-permeable flow channel 51 from both sides of the length direction of the top cover 10 and enters the chamber 31 below the explosion-proof sheet 20, the second air-permeable flow channel 51 and the fourth air-permeable flow channel 51 form a slope. As a result, the airflow can flow the air-permeable flow channel 51 more stably. Moreover, a large amount of airflow is better prevented from directly vertically impacting the explosion-proof sheet 20.

Figure 11:
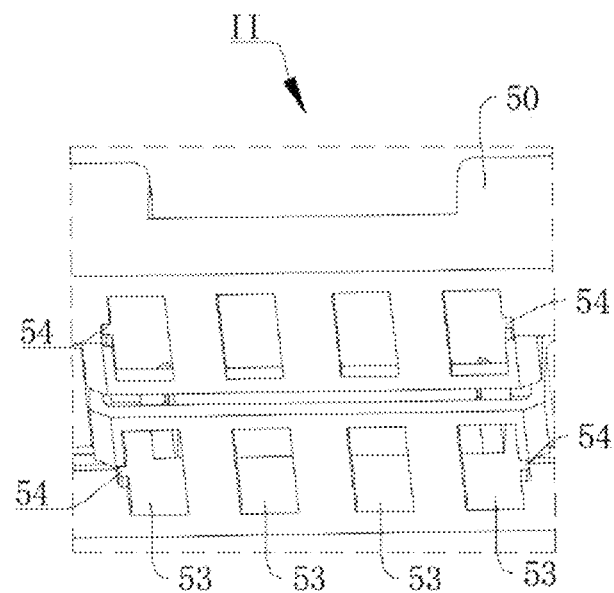
FIG. 11 is an enlarged view of a dashed box II in FIG. 10.

Further referring to FIG. 10 and FIG. 11, in some embodiments, the lower plastic member 50 has a third air vent 53 in communication with the air-permeable flow channel 51 and the space where the electrode assembly 210 is located. An orthographic projection of the third air vent 53 on a surface of the shielding portion 36 facing towards the lower plastic member 50 falls within a range of a surface of the shielding portion 36 facing towards the lower plastic member 50. Through the third air vent 53, the space where the electrode assembly 210 is located can be well connected to the air-permeable flow channel 51. Moreover, the third air-permeable hole 53 is located directly below the shielding portion 36. In this way, when flowing through the third air vent 53 into the air-permeable flow channel 51, the airflow in the space where the electrode assembly 210 is located respectively flows at the outer periphery of the shielding member 30 along the air-permeable flow channel 51 towards two opposite sides of the length direction of the top cover 10, then flows into the chamber 31 from the outer periphery of the shielding member 30 (i.e., flows around the explosion-proof sheet 20 into the chamber 31). In this way, a large amount of gas can be better prevented from directly impacting the explosion-proof sheet 20, thereby preventing the explosion-proof sheet 20 from being accidentally triggered in advance.

Specifically, the third air vent 53 is in communication with the third air-permeable sub-flow channel 513 of the air-permeable flow channel 51.

In an embodiment, the lower plastic member 50 has a plurality of third air vents 53. The plurality of third air vents 53 is arranged at intervals. The lower plastic member 50 further has a fourth air vent 54. The fourth air vent 54 is in communication with a part of the plurality of third air vents 53 and in communication with the air-permeable flow channel 51 and the second air vent 361. By having the fourth air vent 54, the fourth air vent 54 is in communication with a part of the plurality of third air vents 53 and in communication with the air-permeable flow channel 51 and the second air vent 361. In this way, airflow generated in the space where the electrode assembly 210 is located can be increased, allowing it to enter the chamber 31 below the explosion-proof sheet 20 through more paths. As a result, the airflow generated in the space where the electrode assembly 210 is located can reach the chamber 31 in a more balanced manner from various directions, thereby allowing for more balanced force on the explosion-proof sheet 20 and more accurate explosion pressure.

In an exemplary embodiment, the fourth air vent 54 is in communication with a third air vent 53 located near an end portion of the top cover 10 in the length direction of the top cover 10. For example, a part of the fourth air vents 54 are in communication with a third air vent 53 located at a head end of the top cover 10 in the length direction of the top cover 10. A part of the fourth air vents 54 are in communication with a third air vent 53 located at tail end of the top cover 10 in the length direction of the top cover 10. Exemplarily, when provided are two fourth air vents 54 and four third air vents 53, and when the four third air vents 53 are arranged at intervals in the length direction of the top cover 10, one of the two fourth air vents 54 is in communication with a first of the four third air vents 53, and another one of the two fourth air vents 54 is in communication with a fourth of the four third air vents 53.

In an embodiment, an orthographic projection of the fourth air vent 54 on the surface of the shielding portion 36 facing towards the lower plastic member 50 at least partially overlaps with the second air vent 361. In this way, the airflow generated by the space where the electrode assembly 210 is located enters the second air vent 361 through the fourth air vent 54 to directly reach the chamber 31, which shortens a flow channel distance between the space where the electrode assembly 210 is located and the chamber 31.

As a result, part of the airflow can reach the chamber 31 quickly, while another part reaches the chamber 31 slowly, gradually increasing the internal pressure of the chamber instead of rapidly increasing it, thus improving the accuracy of the explosion of the explosion-proof sheet 20. In addition, when the energy storage apparatus 200 vibrates or is impacted, and when the electrolyte flows to the chamber 31 below the explosion-proof sheet 20, the electrolyte can directly flow back into the chamber 31 where the electrode assembly 210 is located through the second air vent 361 and through the fourth air vent 54, thereby shortening the flow channel for electrolyte backflow and avoiding the waste of the electrolyte.

Figure 12:
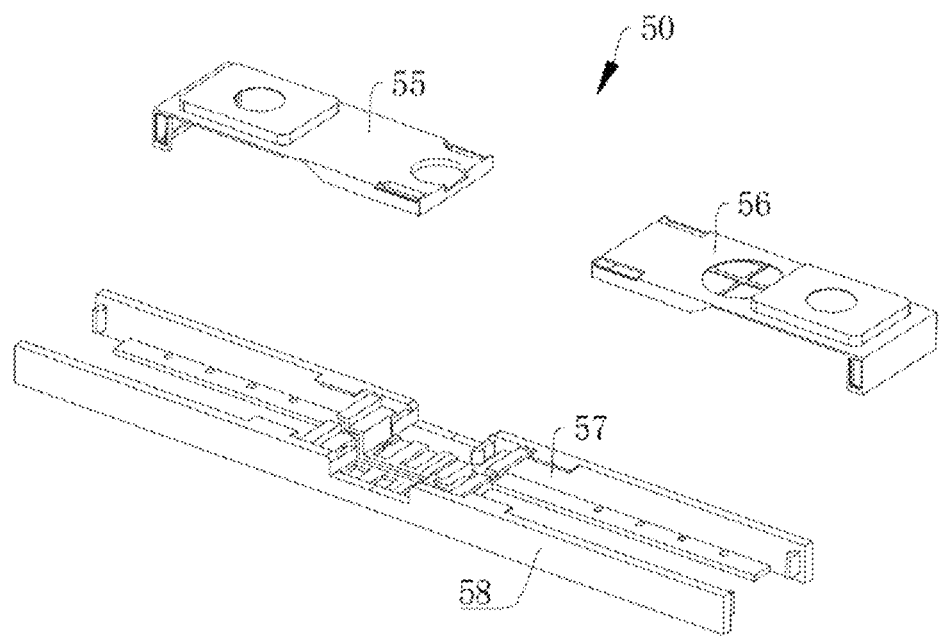
FIG. 12 is a schematic exploded structural view of a lower plastic member according to an embodiment of the present disclosure.
Figure 13:
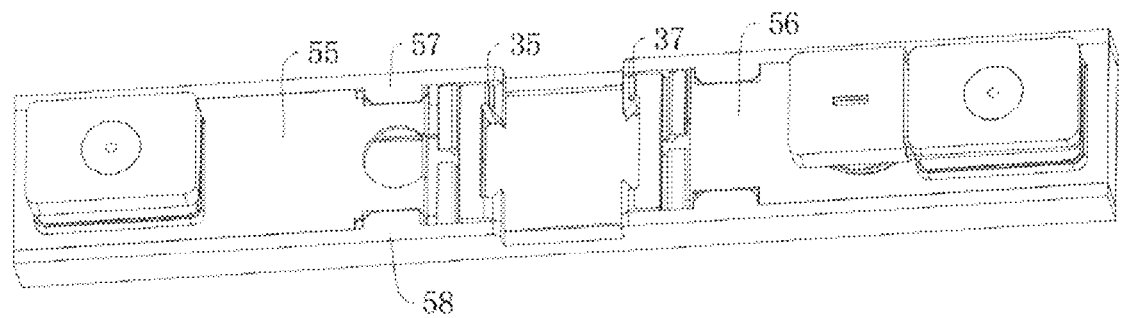
FIG. 13 is a schematic structural view of an end cover assembly according to an embodiment of the present disclosure, in which a top cover is omitted.

Referring to FIG. 12 and FIG. 13, in some embodiments, the lower plastic member 50 includes a first plastic sub-member 55, a second plastic sub-member 56, a third plastic sub-member 57, and a fourth plastic sub-member 58. The first plastic sub-member 55 and the second plastic sub-member 56 are spaced apart from each other at the second surface 13 of the top cover 10 in the length direction of the top cover 10 and are respectively located at two opposite ends of the shielding member 30. The third plastic sub-member 57 is spaced apart from the fourth plastic sub-member 58 in the width direction of the top cover 10. The third plastic sub-member 57 is snapped to the first plastic sub-member 55, the second plastic sub-member 56, and the shielding member 30, respectively. In this way, the third plastic sub-member 57 is respectively snapped to the first plastic sub-member 55, the second plastic sub-member 56, the shielding member 30, and the top cover 10, to be assembled into a whole. The fourth plastic sub-member 58 is snapped to the first plastic sub-member 55, the second plastic sub-member 56, and the shielding member 30, respectively. In this way, the fourth plastic sub-member 58 is respectively snapped to the first plastic sub-member 55, the second plastic sub-member 56, the shielding member 30, and the top cover 10, to be assembled into a whole. The first plastic sub-member 55 and the second plastic sub-member 56 are spaced apart from each other at the second surface 13 of the top cover 10 in the length direction of the top cover 10 and are located at two opposite ends of the shielding member 30, respectively. In this way, the first plastic sub-member 55, the shielding member 30, and the second plastic sub-member 56 are arranged in a same layer, which reduces an influence of the shielding member 30 on the increase of the thickness of the end cover assembly 100, enabling the end cover assembly 100 to have a thinner thickness. In addition, the lower plastic member 50 is generally formed through processes such as injection molding. By providing four plastic sub-members, a manufacturing process of the lower plastic member 50 can be simplified (e.g., the injection mold is simpler, easier to implement, and the like), reducing a manufacturing cost of the lower plastic member 50. Further, the first plastic sub-member 55, the second plastic sub-member 56, the shielding member 30, and the top cover 10 can be assembled into a whole through the third plastic sub-member 57. The first plastic sub-member 55, the second plastic sub-member 56, the shielding member 30, and the top cover 10 can be assembled into a whole through the fourth plastic sub-member 58. Therefore, an assembly process between the lower plastic member 50 and the top cover 10 and an assembly process between the lower plastic member 50 and the shielding member 30 are simplified, which improves an assembly speed of the end cover assembly 100 and decreases the cost of the end cover assembly 100.

It can be understood that the first plastic sub-member 55, the second plastic sub-member 56, the third plastic sub-member 57, and the fourth plastic sub-member 58 each extend in the length direction of the top cover 10, i.e., a length direction of each of the first plastic sub-member 55, the second plastic sub-member 56, the third plastic sub-member 57, and the fourth plastic sub-member 58 is parallel to the length direction of the top cover 10.

Figure 14:
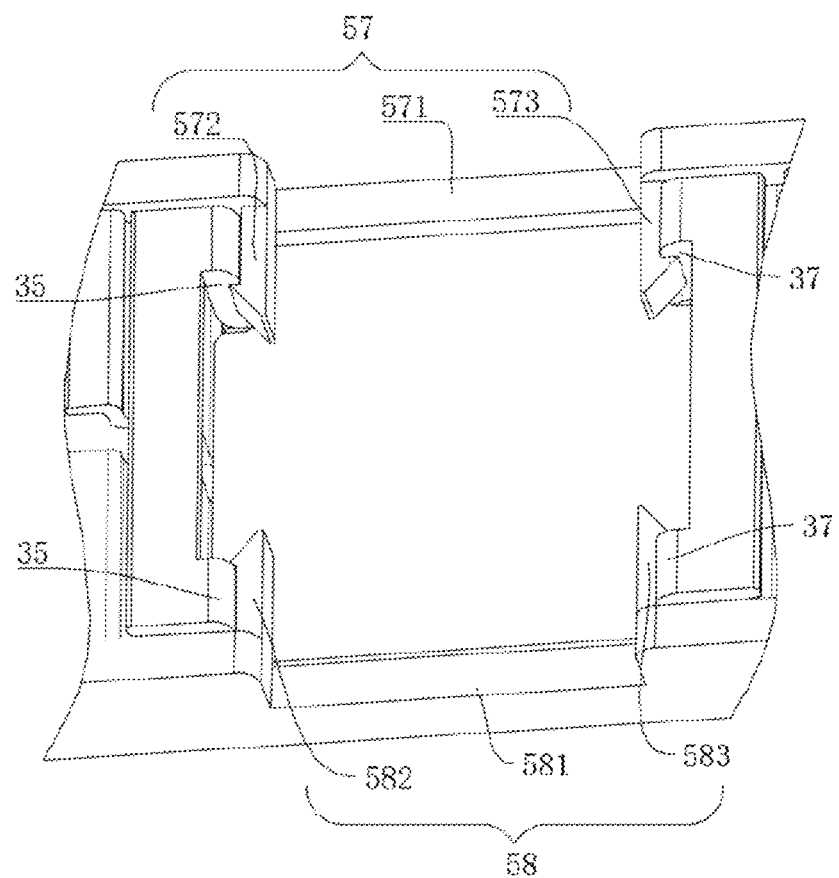
FIG. 14 is a partially enlarged view of FIG. 13.

Referring to FIG. 12 to FIG. 14, in some embodiments, the third plastic sub-member 57 includes a first plastic body portion 571, a first snap portion 572, and a second snap portion 573. The first snap portion 572 is spaced apart from the second snap portion 573 at a side of the first plastic body portion 571 facing towards the shielding member 30. The first snap portion 572 is snapped to the first bent portion 35 of the shielding member 30. The second snap portion 573 is snapped to the second bent portion 37 of the shielding member 30. The first plastic body portion 571 has a plurality of third air vents 53 arranged at intervals in the length direction of the top cover 10 (i.e., the length direction of the first plastic body portion 571). An orthographic projection of the first snap portion 572 on a surface of the first plastic body portion 571 facing towards the shielding member 30 partially overlaps with at least one of the plurality of third air vents 53 of the first plastic body portion 571. An orthographic projection of the second snap portion 573 on the surface of the first plastic body portion 571 facing towards the shielding member 30 partially overlaps with the at least one of the plurality of third air vents 53.

The fourth plastic sub-member 58 includes a second plastic body portion 581, a third snap portion 582, and a fourth snap portion 583. The third snap portion 582 is spaced apart from the fourth snap portion 583 at a side of the second plastic body portion 581 facing towards the shielding member 30. The third snap portion 582 is snapped to a side of the first bent portion 35 of the shielding member 30 facing away from the first snap portion 572. The fourth snap portion 583 is snapped to a side of the second bent portion 37 of the shielding member 30 facing away from the second snap portion 573. The second plastic body portion 581 has a plurality of third air vents 53 arranged at intervals in the length direction of the top cover 10 (i.e., a length direction of the second plastic body portion 581). An orthographic projection of the third snap portion 582 on a surface of the second plastic body portion 581 facing towards the shielding member 30 partially overlaps with at least one of the plurality of third air vents 53 of the second plastic body portion 581. An orthographic projection of the fourth snap portion 583 on the surface of the second plastic body portion 581 facing towards the shielding member 30 partially overlaps with the at least one of the plurality of third air vents 53.

In this embodiment, the orthographic projection of the third snap portion 582 on the surface of the second plastic body portion 581 facing towards the shielding member 30 partially overlaps with the at least one of the plurality of third air vents 53 of the second plastic body portion 581. The orthographic projection of the fourth snap portion 583 on the surface of the second plastic body portion 581 facing towards the shielding member 30 partially overlaps with the at least one of the plurality of third air vents 53. In this way, after the third plastic sub-member 57 and the fourth plastic sub-member 58 are assembled, a case where the first snap portion 572, the second snap portion 573, the third snap portion 582, and the fourth snap portion 583 each are snapped to the shielding member 30 can be viewed through the third air vent 53. Therefore, it facilitates determination of whether the first snap portion 572, the second snap portion 573, the third snap portion 582, and the fourth snap portion 583 are installed in place.

It can be understood that during assembly of the third plastic sub-member 57, the first snap portion 572 and the second snap portion 573 are inserted into one first air vent 33 (i.e., one of the first air vents 33 arranged in the width direction of the top cover 10). Finally, the first snap portion 572 is snapped to the first bent portion 35 of the shielding member 30. The second snap portion 573 is snapped to the second bent portion 37 of the shielding member 30. The third snap portion 582 and the fourth snap portion 583 are each inserted into the other first air vents 33 (i.e., another one of the first air vents 33 arranged in the width direction of the top cover 10). Finally, the third snap portion 582 is snapped to the side of the first bent portion 35 of the shielding member 30 facing away from the first snap portion 572. The fourth snap portion 583 is snapped to the side of the second bent portion 37 of the shielding member 30 facing away from the second snap portion 573.

In an exemplary embodiment, the third plastic sub-member 57 has four third air vents 53 arranged at intervals in the length direction of the top cover 10; and the fourth plastic sub-member 58 has four third air vents 53 arranged at intervals in the length direction of the top cover 10.

Figure 15:
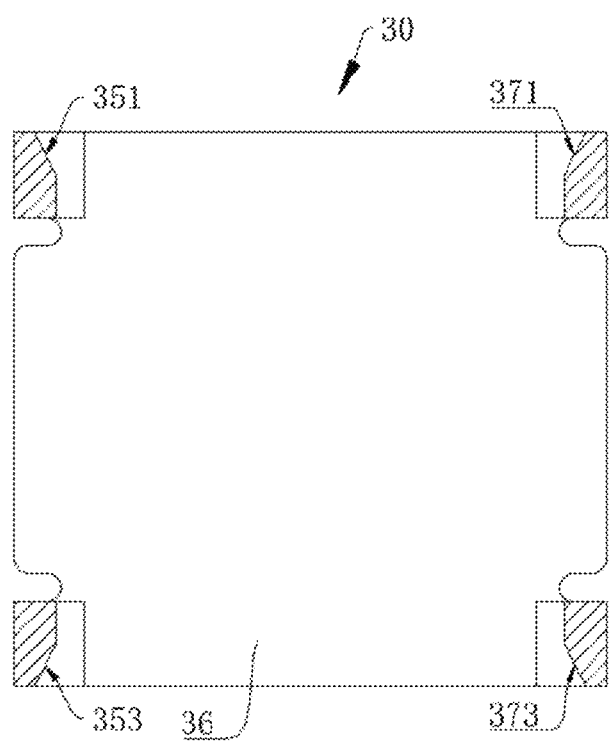
FIG. 15 is a schematic cross-sectional and structural view, taken in a direction B-B direction in FIG. 7, of a shielding member according to an embodiment of the present disclosure.

Referring to FIG. 15, in some embodiments, a surface of the first bent portion 35 facing towards the chamber 31 includes a first guide inclined surface 351 and a second guide inclined surface 353. In the width direction of the top cover 10, the first guide inclined surface 351 and the second guide inclined surface 353 are spaced apart from each other and located at two opposite ends of the first bent portion 35. A surface of the second bent portion 37 facing towards the chamber 31 includes a third guide inclined surface 371 and a fourth guide inclined surface 373. In the width direction of the top cover 10, the third guide inclined surface 371 and the fourth guide inclined surface 373 are spaced apart from each other and located at two opposite ends of the second bent portion 37. The first guide inclined surface 351 is opposite to the third guide inclined surface 371. The second guide inclined surface 353 is opposite to the fourth guide inclined surface 373. The first guide inclined surface 351 is configured to guide the first snap portion 572. The second guide inclined surface is configured to guide the third snap portion 582. The third guide inclined surface 371 is configured to guide the second snap portion 573. The fourth guide inclined surface is configured to guide the fourth snap portion 583.

In this embodiment, by providing the first guide inclined surface 351, the second guide inclined surface 353, the third guide inclined surface 371, and the fourth guide inclined surface 373, during assembly of each of the third plastic sub-member 57 and the fourth plastic sub-member 58, the first snap portion 572, the second snap portion 573, the third snap portion 582, and the fourth snap portion 583 can be guided, allowing the first snap portion 572 to be snapped and inserted into the first bent portion 35 or the second bent portion 37. In this way, the third plastic sub-member 57 and the fourth plastic sub-member 58 can be better assembled.

It can be understood that the first guide inclined surface 351 and the second guide inclined surface 353 are located at two opposite sides of the first air vent 33 on the first bent portion 35, respectively. The third guide inclined surface 371 and the fourth guide inclined surface 373 are located at two opposite sides of the first air vent 33 on the second bent portion 37, respectively.

It can also be understood that the first snap portion 572 is located in two adjacent first air vents 33. i.e., the first snap portion 572 is partially located in the first air vent 33 in the length direction of the top cover 10 and partially located in the first air vent 33 in the width direction of the top cover 10. The second snap portion 573 is located in the two adjacent first air vents 33, i.e., the second snap portion 573 is partially located in the first air vent 33 in the length direction of the top cover 10 and partially located in the first air vent 33 in the width direction of the top cover 10. The third snap portion 582 is located in the two adjacent first air vents 33, i.e., the third snap portion 582 is partially located in the first air vent 33 in the length direction of the top cover 10 and partially located in the first air vent 33 in the width direction of the top cover 10. The fourth snap portion 583 is located in the two adjacent first air vents 33, i.e., the fourth snap portion 583 is partially located in the first air vent 33 in the length direction of the top cover 10 and is partially located in the first air vent 33 in the width direction of the top cover 10.

Figure 16:
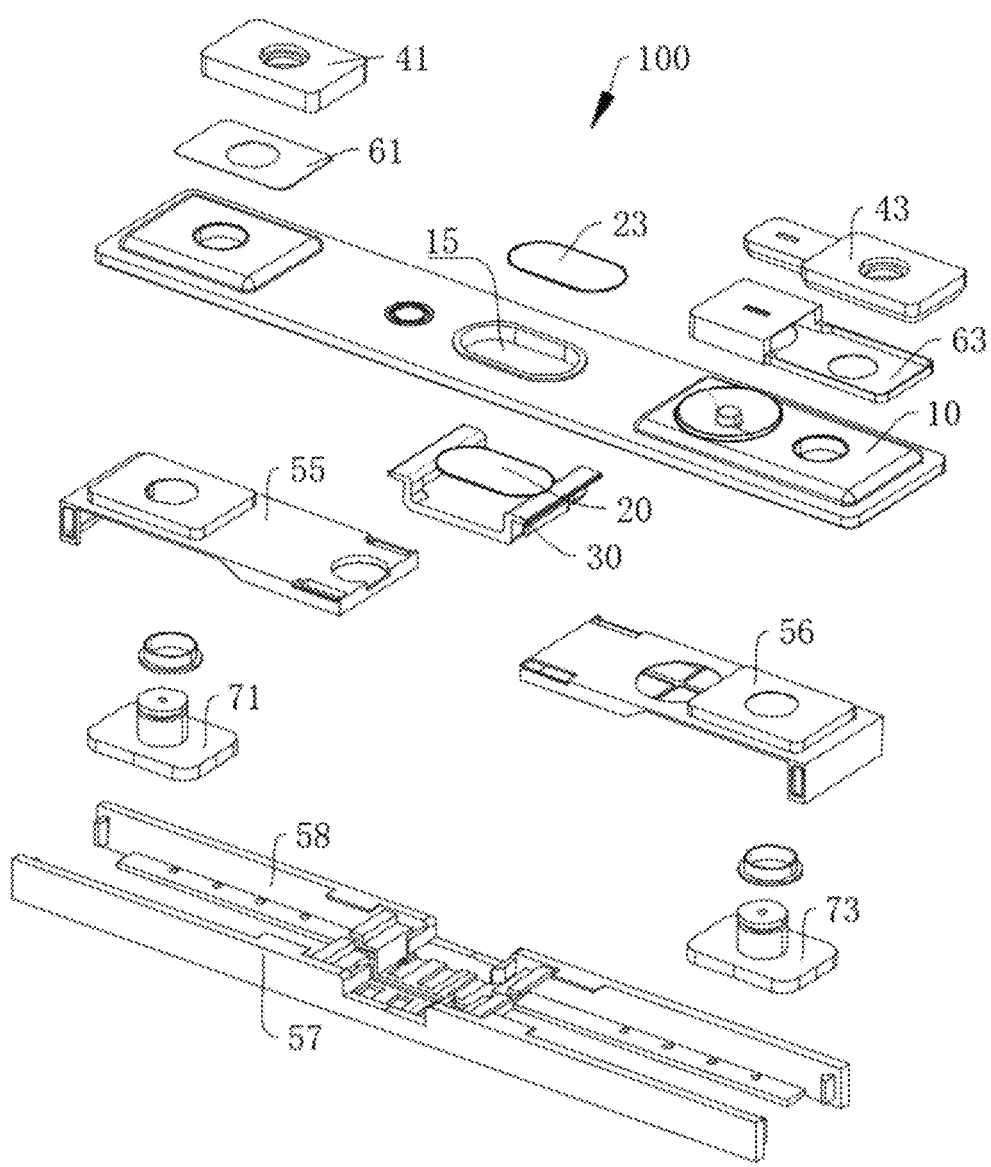
FIG. 16 is a schematic exploded structural view of an end cover assembly according to an embodiment of the present disclosure.
Figure 17:
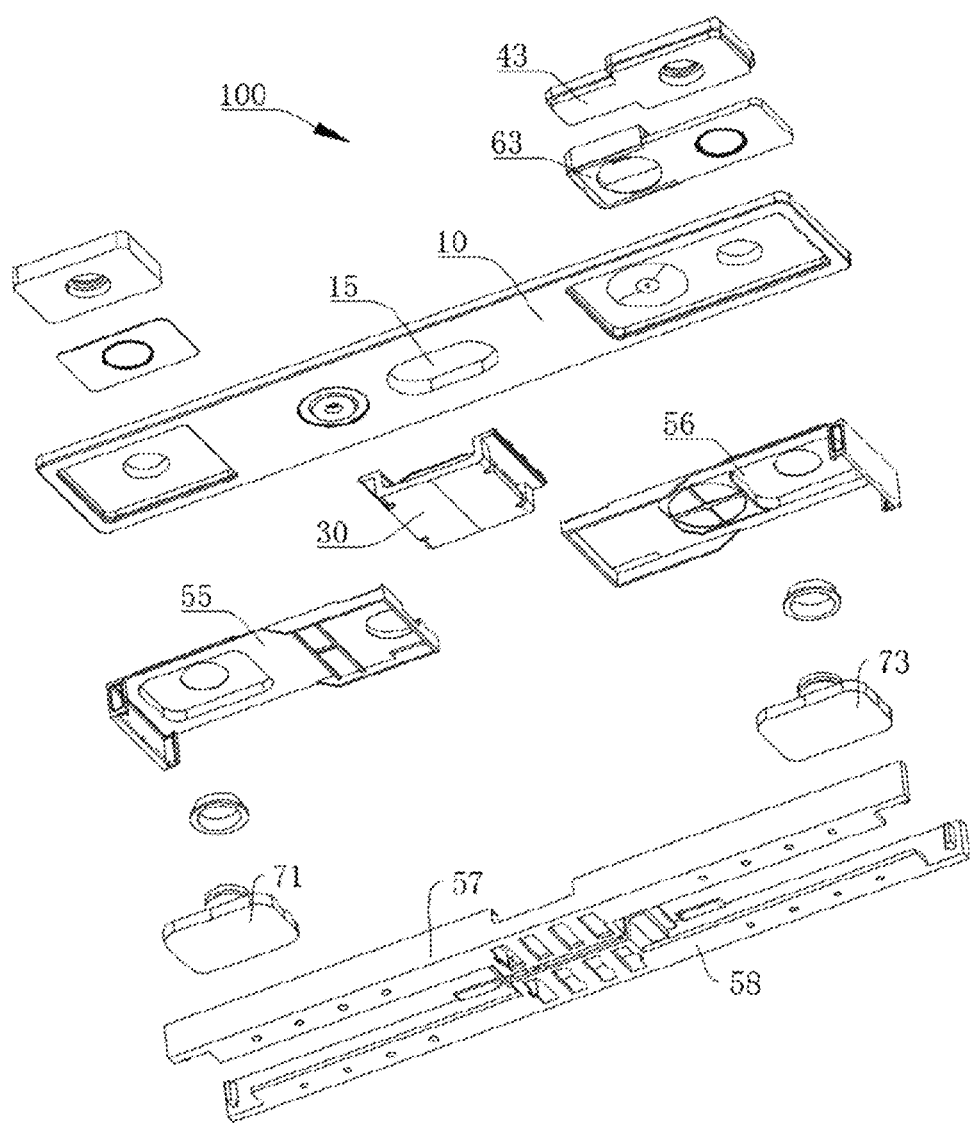
FIG. 17 is a schematic exploded structural view of another viewing angle of the end cover assembly according to the embodiment of the present disclosure in FIG. 16.

Referring to FIG. 16 and FIG. 17, in some embodiments, the end cover assembly 100 according to the embodiments of the present disclosure also includes a protection sheet 23. The protection sheet 23 is arranged at a side of the explosion-proof sheet 20 facing away from the lower plastic member 50 (i.e., a side of the first surface 11 of the top cover 10), is configured to seal the explosion-proof hole 15, and protects the explosion-proof sheet 20, thereby preventing the foreign matter from impacting and damaging the explosion-proof sheet 20. In this way, overflow of the electrolyte inside the energy storage apparatus 200 is caused.

In some embodiments, the end cover assembly 100 according to an embodiment of the present disclosure also includes a top patch (not shown). The top patch is arranged on the first surface 11 of the top cover 10.

In some embodiments, the end cover assembly 100 according to an embodiment of the present disclosure also includes a positive metal pressing block 41 and a negative metal pressing block 43. The positive metal pressing block 41 and the negative metal pressing block 43 are spaced apart from each other at the side of the first surface 11 of the top cover 10 and are insulated from the top cover 10, respectively. The positive metal pressing block 41 is electrically connected to the positive adapter sheet 231. The negative metal pressing block 43 is electrically connected to the negative adapter sheet 233. The positive metal pressing block 41 is engaged with the negative metal pressing block 43 to implement an electrical connection or conduction between the energy storage apparatus 200 and an external electric device or other energy storage apparatuses 200.

In some embodiments, the end cover assembly 100 according to an embodiment of the present disclosure also includes a positive upper plastic member 61 and a negative upper plastic member 63. The positive upper plastic member 61 is at least partially located between the positive metal pressing block 41 and the top cover 10 for insulating the positive metal pressing block 41 from the top cover 10. The negative upper plastic member 63 is at least partially located between the negative metal pressing block 43 and the top cover 10 for insulating the negative metal pressing block 43 from the top cover 10.

In an embodiment, the positive upper plastic member 61 can be made of, but not limited to, resin, rubber, or other insulating parts. The negative upper plastic member 63 can be made of, but not limited to, resin, rubber, or other insulating parts.

In some embodiments, the end cover assembly 100 according to an embodiment of the present disclosure also includes a positive pole 71 and a negative pole 73. The positive pole 71 sequentially passes through the lower plastic member 50, the top cover 10, the positive upper plastic member 61, and the positive metal pressing block 41, and is welded to the positive metal pressing block 41. An end of the positive pole 71 facing away from a metal pressing block is welded to the positive adapter sheet 231, to realize an electrical connection between the positive metal pressing block 41 and the positive electrode plate. The negative pole 73 sequentially passes through the lower plastic member 50, the top cover 10, the negative upper plastic member 63, and the negative metal pressing block 43, and is welded to the negative metal pressing block 43. An end of the negative pole 73 facing away from the metal pressing block is welded to the negative adapter sheet 233, to realize an electrical connection between the negative metal pressing block 43 and the negative electrode plate.

In an embodiment, each of the positive pole 71 and the negative pole 73 includes a flange portion (not shown) and a protruding post (not shown) protruding from a surface of the flange portion. The flange portion is located between the lower plastic member 50 and the positive adapter sheet 231/the negative adapter sheet 233, and is welded to the positive adapter sheet 231/the negative adapter sheet 233. The protruding post sequentially passes through the lower plastic member 50, the top cover 10, the positive upper plastic member 61/negative upper plastic member 63, and the positive metal pressing block 41/negative metal pressing block 43. In this way, the positive metal pressing block 41 is electrically connected to the positive adapter sheet 231 through the positive pole 71. The negative metal pressing block 43 is electrically connected to the negative adapter sheet 233 through the negative pole 73.

In an embodiment, the flange portion is arranged at a side of the lower plastic member 50 facing away from the top cover 10. The protruding post has a central axis. The positive pole 71 and the negative pole 73 are each rotationally symmetric along the central axis. In this way, assembly of the positive pole 71 and the negative pole 73 without distinguishing between left and right directions is allowed. Moreover, the positive pole 71 and the negative pole 73 can be inserted directly after their long edges are aligned, thereby reducing the requirements for the assembly of the positive pole 71 and the negative pole 73.

In the present disclosure, reference to "embodiment" and "implementation" mean that a particular feature, structure, or characteristic described in conjunction with the embodiment may be included in at least one embodiment of the present disclosure. The presence of the term at each place in the specification does not necessarily refer to the same embodiment, nor does it refer to a separate or alternative embodiment that is mutually exclusive of other embodiments. It should be understood by those skilled in the art, both explicitly and implicitly, that the embodiments described herein may be combined with other embodiments. In addition, it should also be understood that the features, structures, or characteristics described in the embodiments of the present disclosure may be arbitrarily combined without conflict with each other to form yet another embodiment without departing from the spirit and scope of the technical solutions of the present disclosure.

Finally, it should be noted that the above implementations are used only to illustrate, rather than to limit, the technical solutions of the present disclosure. Although the present disclosure has been described in detail with reference to the above preferred implementations, it should be understood by those skilled in the art that modifications or equivalent replacements, which do not depart from the spirit and scope of the technical solutions of the present disclosure, can be made to the technical solutions of the present disclosure.

What is claimed is:

1. An end cover assembly (100), applied in an energy storage apparatus (200) comprising an electrode assembly (210), the end cover assembly (100) comprising:
a top cover (10) having a first surface (11) and a second surface (13) facing away from the first surface (11), the top cover (10) having an explosion-proof hole (15) through the first surface (11) and the second surface (13), the top cover (10) having a length direction and a width direction, and a length of the top cover (10) in the length direction being greater than a length of the top cover (10) in the width direction;
an explosion-proof sheet (20) configured to seal the explosion-proof hole (15) and connected to the top cover (10); and
a shielding member (30) located at a side of the explosion-proof sheet (20) close to the second surface (13), the shielding member (30) being connected to the top cover (10), the top cover (10), the explosion-proof sheet (20), and the shielding member (30) forming a chamber (31), wherein the shielding member (30) has a plurality of first air vents (33) arranged at intervals along a peripheral side wall of the shielding member (30), the plurality of first air vents (33) being in communication with the chamber (31) and in communication with a space where the electrode assembly (210) of the energy storage apparatus (200) is located, the plurality of first air vents (33) comprising a first group of first air vents (33a) and a second group of first air vents (33b), a first air vent (33) in the first group of first air vents (33a) extending in the length direction of the top cover (10), and a first air vent (33) in the second group of first air vents (33b) extending in the width direction of the top cover (10), and wherein the shielding member (30) comprises a first connection portion (34), a first bent portion (35), a shielding portion (36), a second bent portion (37), and a second connection portion (38) that are sequentially bent and connected to each other, the first connection portion (34) and the shielding portion (36) being respectively located at two opposite sides of the first bent portion (35), the first bent portion (35) and the second bent portion (37) being located at one side of the shielding portion (36), the shielding portion (36) and the second connection portion (38) being respectively located at two opposite sides of the second bent portion (37), the shielding portion (36) and the explosion-proof sheet (20) being spaced apart from each other, the first connection portion (34) and the second connection portion (38) being spaced apart from each other in the length direction of the top cover (10), each of the first connection portion (34) and the second connection portion (38) being connected to the second surface (13) of the top cover (10), the first connection portion (34) comprising a first body portion (341) and a first protrusion portion (343) connected to the first body portion (341), the first body portion (341) being connected to the second surface (13) of the top cover (10), the first protrusion portion (343) protruding from a side of the first body portion (341) facing away from the top cover (10), the second connection portion (38) comprising a second body portion (381) and a second protrusion portion (383) connected to the second body portion (381), the second body portion (381) being connected to the second surface (13) of the top cover (10), and the second protrusion portion (383) protruding from a side of the second body portion (381) facing away from the top cover (10), wherein:
a ratio of a length W1 of the first air vent (33) in the first group of first air vents (33a) in the length direction of the top cover (10) to a maximum length D1 of the explosion-proof sheet (20) in the length direction of the top cover ranges from 0.8 to 1.2; and
a ratio of a length W2 of the first air vent (33) in the second group of first air vents (33b) in the width direction of the top cover (10) to a length D2 of the explosion-proof sheet (20) in the width direction of the top cover ranges from 0.7 to 1.3.

2. The end cover assembly (100) according to claim 1, wherein:
the plurality of first air vents (33) comprises four first air vents (33), two of the four first air vents (33) being spaced apart from each other in the length direction of the top cover (10), and another two of the four first air vents (33) being spaced apart from each other in the width direction of the top cover (10); and
a cross-sectional area S1 of each of the other two of the four first air vents (33) arranged in the width direction of the top cover (10) is greater than a cross-sectional area S2 of each of the two of the four first air vents (33) arranged in the length direction of the top cover (10), a ratio of the cross-sectional area S1 of each of the two of the four first air vents (33) arranged in the length direction of the top cover (10) to the cross-sectional area S2 of each of the other two of the four first air vents (33) arranged in the width direction of the top cover (10) ranges from 1.18 to 1.76.

3. The end cover assembly (100) according to claim 1, wherein:
the cross-sectional area S1 of the first air vent (33) arranged in the length direction of the top cover (10) ranges from 51 mm$^2$ to 91.5 mm$^2$; and
the cross-sectional area S2 of the first air vent (33) arranged in the width direction of the top cover (10) ranges from 60 mm$^2$ to 108 mm$^2$.

4. The end cover assembly (100) according to claim 1, wherein:
the first connection portion (34) the first bent portion (35), the shielding portion (36), the second bent portion (37), the second connection portion (38), and the top cover (10) form the first group of first air vents (33a) having two first air vents (33) spaced apart from each other in the width direction of the top cover (10); and
each of the first bent portion (35) and the second bent portion (37) has a first air vent (33).

5. The end cover assembly (100) according to claim 4, wherein a distance L1 between the shielding portion (36) and the explosion-proof sheet (20) ranges from 3.3 hum to 7.34 mm.

6. The end cover assembly (100) according to claim 4, further comprising a lower plastic member (50) arranged at a side of the second surface (13) of the top cover (10) and snapped to the shielding member (30), an air-permeable flow channel (51) being formed between the lower plastic member (50) and the shielding member (30) and in communication with the plurality of first air vents (33).

7. The end cover assembly (100) according to claim 6, wherein the shielding portion (36) has a second air vent (361) in communication with each of the chamber (31), the plurality of first air vents (33), and the air-permeable flow channel (51).

8. The end cover assembly (100) according to claim 7, wherein the second air vent (361) has a cross-sectional area S3 ranging from 1 mm² to 5 mm².

9. The end cover assembly (100) according to claim 6, wherein the air-permeable flow channel (51) has a first air-permeable sub-flow channel (511), a second air-permeable sub-flow channel (512), a third air-permeable sub-flow channel (513), a fourth air-permeable sub-flow channel (514), and a fifth air-permeable sub-flow channel (515) that are sequentially bent and in communication with each other, wherein:
- the first air-permeable sub-flow channel (511) and the third air-permeable sub-flow channel (513) are respectively located at two opposite sides of the second air-permeable sub-flow channel (512), the second air-permeable sub-flow channel (512) and the fourth air-permeable sub-flow channel (514) being located at one side of the third air-permeable sub-flow channel (513), the third air-permeable sub-flow channel (513) and the fifth air-permeable sub-flow channel (515) being respectively located at two opposite sides of the fourth air-permeable sub-flow channel (514);
- the second air-permeable sub-flow channel (512) is in communication with the first air vent (33) of the first bent portion (35); and
- the fourth air-permeable sub-flow channel (514) is in communication with the first air vent (33) of the second bent portion (37).

10. The end cover assembly (100) according to claim 7, wherein:
- the lower plastic member (50) has a third air vent (53) in communication with the air-permeable flow channel (51) and in communication with the space where the electrode assembly (210) is located; and
- an orthographic projection of the third air vent (53) on a surface of the shielding portion (36) facing towards the lower plastic member (50) falls within a range of the surface of the shielding portion (36) facing towards the lower plastic member (50).

11. The end cover assembly (100) according to claim 10, wherein:
- the lower plastic member (50) has a plurality of third air vents (53) arranged at intervals and a fourth air vent (54), the fourth air vent (54) being in communication with a part of the plurality of third air vents (53) and in communication with the air-permeable flow channel (51) and the second air vent (361); and
- an orthographic projection of the fourth air vent (54) on the surface of the shielding portion (36) facing towards the lower plastic member (50) at least partially overlaps with the second air vent (361).

12. The end cover assembly (100) according to claim 6, wherein the lower plastic member (50) comprises a first plastic sub-member (55), a second plastic sub-member (56), a third plastic sub-member (57), and a fourth plastic sub-member (58), wherein:
- the first plastic sub-member (55) and the second plastic sub-member (56) are spaced apart from each other in the length direction of the top cover (10), arranged on the second surface (13) of the top cover (10), and respectively located at two opposite ends of the shielding member (30);
- the third plastic sub-member (57) and the fourth plastic sub-member (58) are spaced apart from each other in the width direction of the top cover (10), the third plastic sub-member (57) being respectively snapped to each of the first plastic sub-member (55), the second plastic sub-member (56), and the shielding member (30); and
- the fourth plastic sub-member (58) is snapped to each of the first plastic sub-member (55), the second plastic sub-member (56), and the shielding member (30).

13. The end cover assembly (100) according to claim 12, wherein:
- the third plastic sub-member (57) comprises a first plastic body portion (571), a first snap portion (572), and a second snap portion (573), wherein the first snap portion (572) and the second snap portion (573) are spaced apart from each other and arranged at a side of the first plastic body portion (571) facing towards the shielding member (30), the first snap portion (572) being snapped to the first bent portion (35) of the shielding member (30), and the second snap portion (573) being snapped to the second bent portion (37) of the shielding member (30); wherein the first plastic body portion (571) has a plurality of third air vents (53) arranged at intervals in the length direction of the top cover (10); wherein an orthographic projection of the first snap portion (572) on a surface of the first plastic body portion (571) facing towards the shielding member (30) partially overlaps with at least one of the plurality of third air vents (53) of the first plastic body portion (571); and wherein au orthographic projection of the second snap portion (573) on the surface of the first plastic body portion (571) facing towards the shielding member (30) partially overlaps with the at least one of the plurality of third air vents (53); and
- the fourth plastic sub-member (58) comprises a second plastic body portion (581), a third snap portion (582), and a fourth snap portion (583), wherein the third snap portion (582) and the fourth snap portion (583) are spaced apart from each other and arranged at a side of the second plastic body portion (581) facing towards the shielding member (30), the third snap portion (582) being snapped to a side of the first bent portion (35) of the shielding member (30) facing away from the first snap portion (572), and the fourth snap portion (583) being snapped to a side of the second bent portion (37) of the shielding member (30) facing away from the second snap portion (573); wherein the second plastic body portion (581) has a plurality of third air vents (53) arranged at intervals in the length direction of the top cover (10); wherein an orthographic projection of the third snap portion (582) on a surface of the second plastic body portion (581) facing towards the shielding member (30) partially overlaps with at least one of the plurality of third air vents (53) of the second plastic body portion (581); and wherein an orthographic projection of the fourth snap portion (583) on the surface of the second plastic body portion (581) facing towards the shielding member (30) partially overlaps with the at least one of the plurality of third air vents (53).

14. The end cover assembly (100) according to claim 13, wherein:
- the first bent portion (35) has a first guide inclined surface (351) and a second guide inclined surface (353) on a surface of the first bent portion (35) facing towards the chamber (31);
- in the width direction of the top cover (10), the first guide inclined surface (351) and the second guide inclined surface (353) being spaced apart from each other and arranged at two opposite ends of the first bent portion (35);

the second bent portion (37) has a third guide inclined surface (371) and a fourth guide inclined surface (373) on a surface of the second bent portion (37) facing towards the chamber (31);

in the width direction of the top cover (10), the third guide inclined surface (371) and the fourth guide inclined surface (373) being spaced apart from each other and arranged at two opposite ends of the second bent portion (37);

the first guide inclined surface (351) is opposite to the third guide inclined surface (371) and the second guide inclined surface (353) is opposite to the fourth guide inclined surface (373);

the first guide inclined surface (351) is configured to guide the first snap portion (572) and the second guide inclined surface is configured to guide the third snap portion (582); and the third guide inclined surface (371) is configured to guide the second snap portion (573) and the fourth guide inclined surface is configured to guide the fourth snap portion (583).

15. The end cover assembly (100) according to claim 1, wherein the shielding member (30) has an identity identification code on a surface of the shielding member (30) facing away from the top cover (10).

16. An energy storage apparatus (200), comprising:
   the end cover assembly (100) according to claim 1;
   an adapter sheet (230) arranged at a side of a top cover (10) facing away from the first surface (11), the adapter sheet (230) having an end electrically connected to the end cover assembly (100); and
   an electrode assembly (210) arranged at a side of the adapter sheet (230) facing away from the end cover assembly (100), the electrode assembly (210) being electrically connected to an end of the adapter sheet (230) facing away from the end cover assembly (100).

17. The energy storage apparatus (200) according to claim 16, wherein a minimum spacing L2 between a surface of a shielding member (30) facing away from the top cover (10) and the electrode assembly (210) ranges from 1.4 mm to 5.8 mm.

18. An electric device (300), comprising:
   an electric device body (310); and
   the energy storage apparatus (200) according to claim 16, the energy storage apparatus (200) being configured to supply power to the electric device body (310).

* * * * *

UNITED STATES PATENT AND TRADEMARK OFFICE
CERTIFICATE OF CORRECTION

| | | |
|---|---|---|
| PATENT NO. | : 12,034,170 B1 | Page 1 of 1 |
| APPLICATION NO. | : 18/533140 | |
| DATED | : July 9, 2024 | |
| INVENTOR(S) | : Wenyang Zhou et al. | |

It is certified that error appears in the above-identified patent and that said Letters Patent is hereby corrected as shown below:

On the Title Page

The (30) Foreign Application Priority Data was omitted, insert:
--(30) Foreign Application Priority Data
Feb. 09, 2023 (CN)..................202310091080.5--

Signed and Sealed this
Thirtieth Day of September, 2025

John A. Squires
*Director of the United States Patent and Trademark Office*